(12) United States Patent
Hirota

(10) Patent No.: US 6,477,437 B1
(45) Date of Patent: Nov. 5, 2002

(54) ASSEMBLY WORK SUPPORT SYSTEM

(75) Inventor: Yo Hirota, Yokkaichi (JP)

(73) Assignee: Sumitomo Wiring Systems, Ltd., Yokkaichi (JP)

(*) Notice: Subject to any disclaimer, the term of this patent is extended or adjusted under 35 U.S.C. 154(b) by 0 days.

(21) Appl. No.: 09/448,439

(22) Filed: Nov. 24, 1999

(30) Foreign Application Priority Data

Nov. 27, 1998 (JP) .................................. 10-337344

(51) Int. Cl.[7] .............................................. G06F 19/00
(52) U.S. Cl. ..................... 700/95; 700/108; 700/111
(58) Field of Search ........................... 700/95, 96, 108, 700/111, 117; 434/118, 223, 320, 369

(56) References Cited

U.S. PATENT DOCUMENTS

| | | | | |
|---|---|---|---|---|
| 4,910,795 A | * | 3/1990 | McCowen et al. ............. | 455/95 |
| 4,947,028 A | * | 8/1990 | Gorog ........................ | 235/381 |
| 5,805,465 A | * | 9/1998 | Itoh .............................. | 700/95 |
| 5,864,482 A | * | 1/1999 | Hazama et al. ............... | 700/95 |
| 6,169,934 B1 | * | 1/2001 | Nakayama et al. ........... | 700/95 |
| 6,349,238 B1 | * | 2/2002 | Gabbita et al. ............. | 700/101 |

FOREIGN PATENT DOCUMENTS

JP          8-271570          10/1996

OTHER PUBLICATIONS

Presentation 1 (1998).
Presentation 2, (1998), with English translation.

* cited by examiner

Primary Examiner—Leo Picard
Assistant Examiner—Alexander J Kosowski
(74) Attorney, Agent, or Firm—Greenblum & Bernstein, P.L.C.

(57) ABSTRACT

An assembly work support system includes a training and simulation mode and a work-support mode, with an operator controlling voice or display output by interactive input. The assembly work support system accepts interactive input from the operator in the form of user-interactive control of his or her review of processes to be learned, and includes a simulation mode that gives feedback messages to the operator, a teaching portion with multimedia instructions and simulation exercises with feedback. A central processor or server gathers work flow data and evaluates the data.

31 Claims, 16 Drawing Sheets

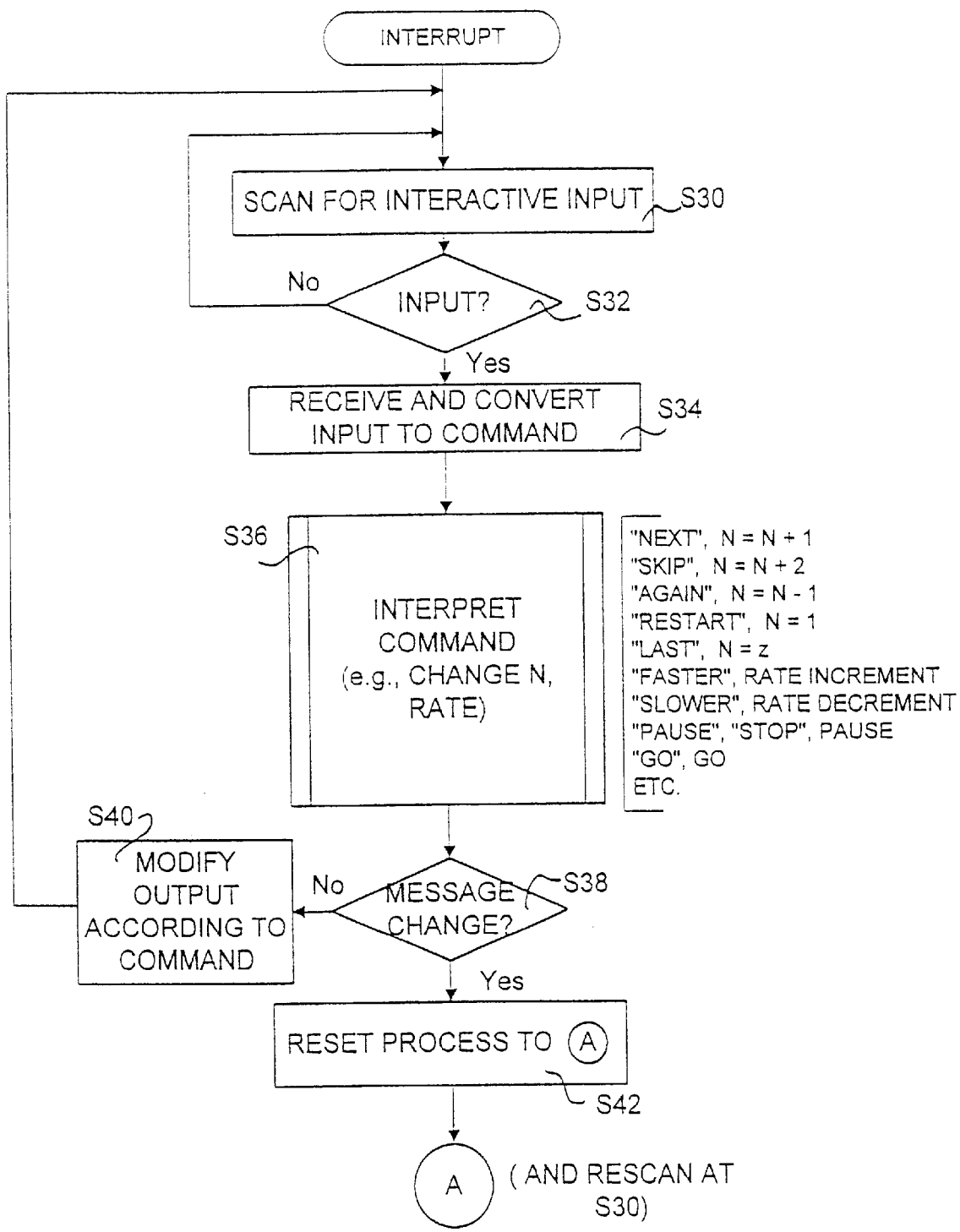

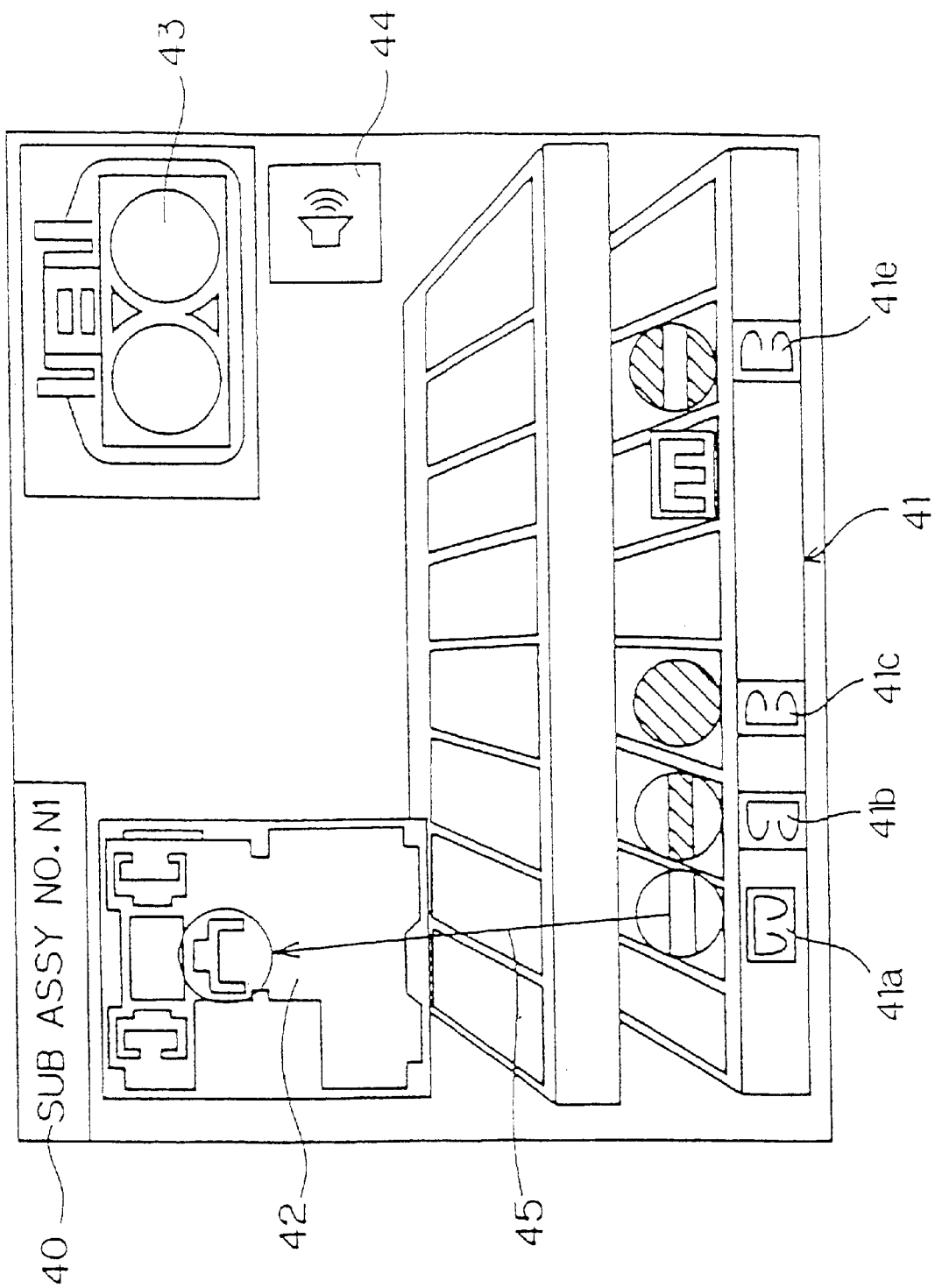

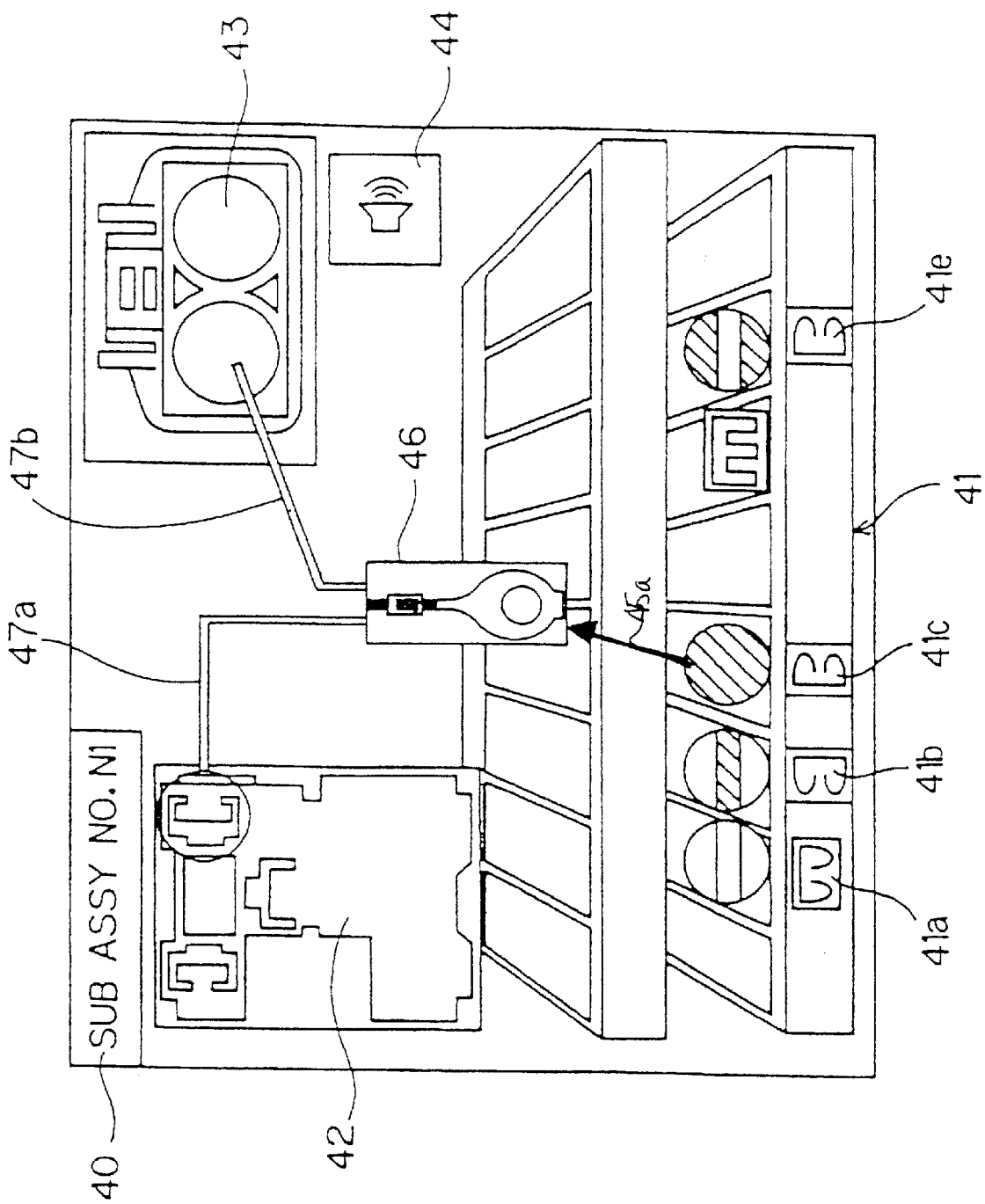

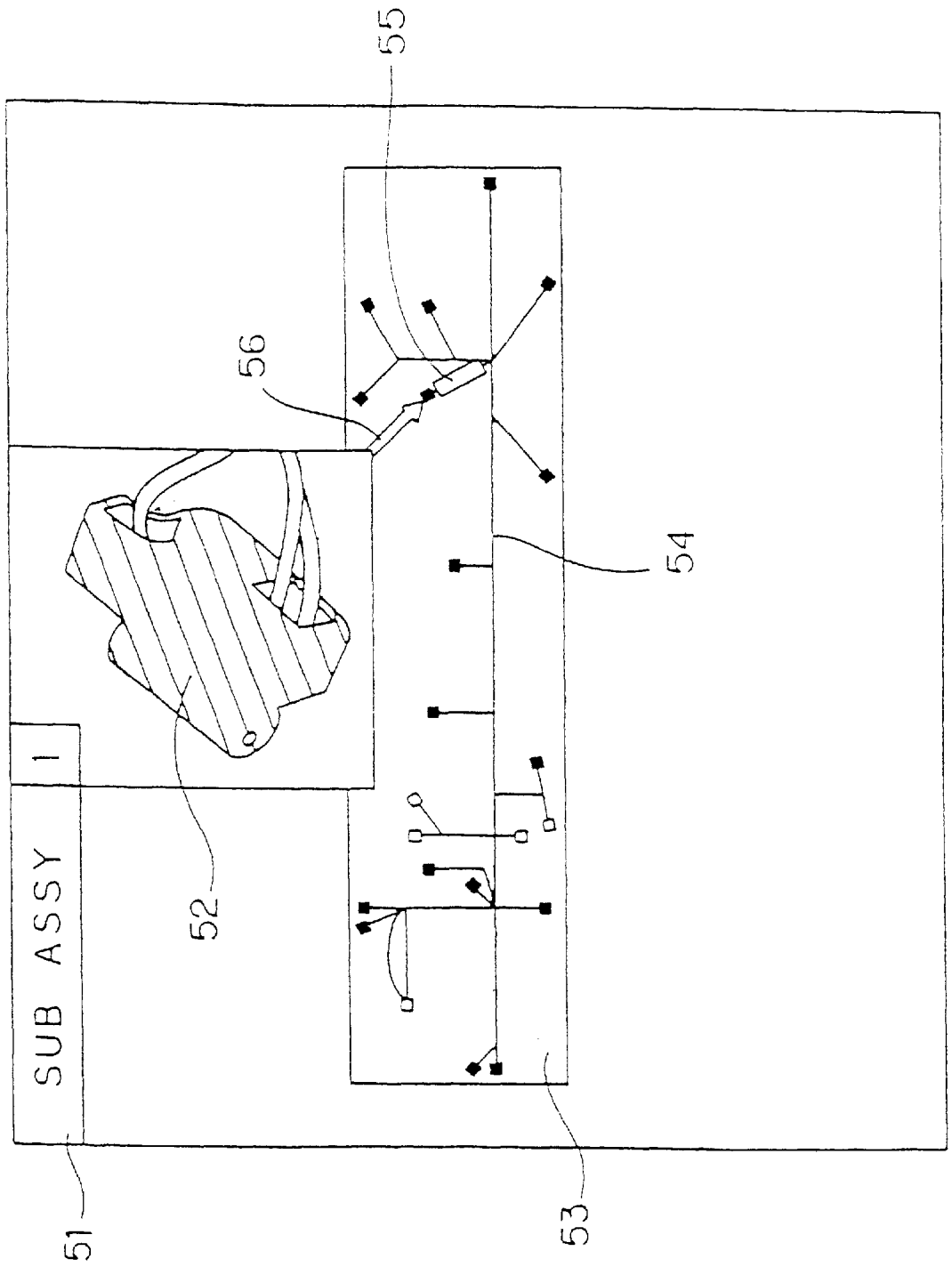

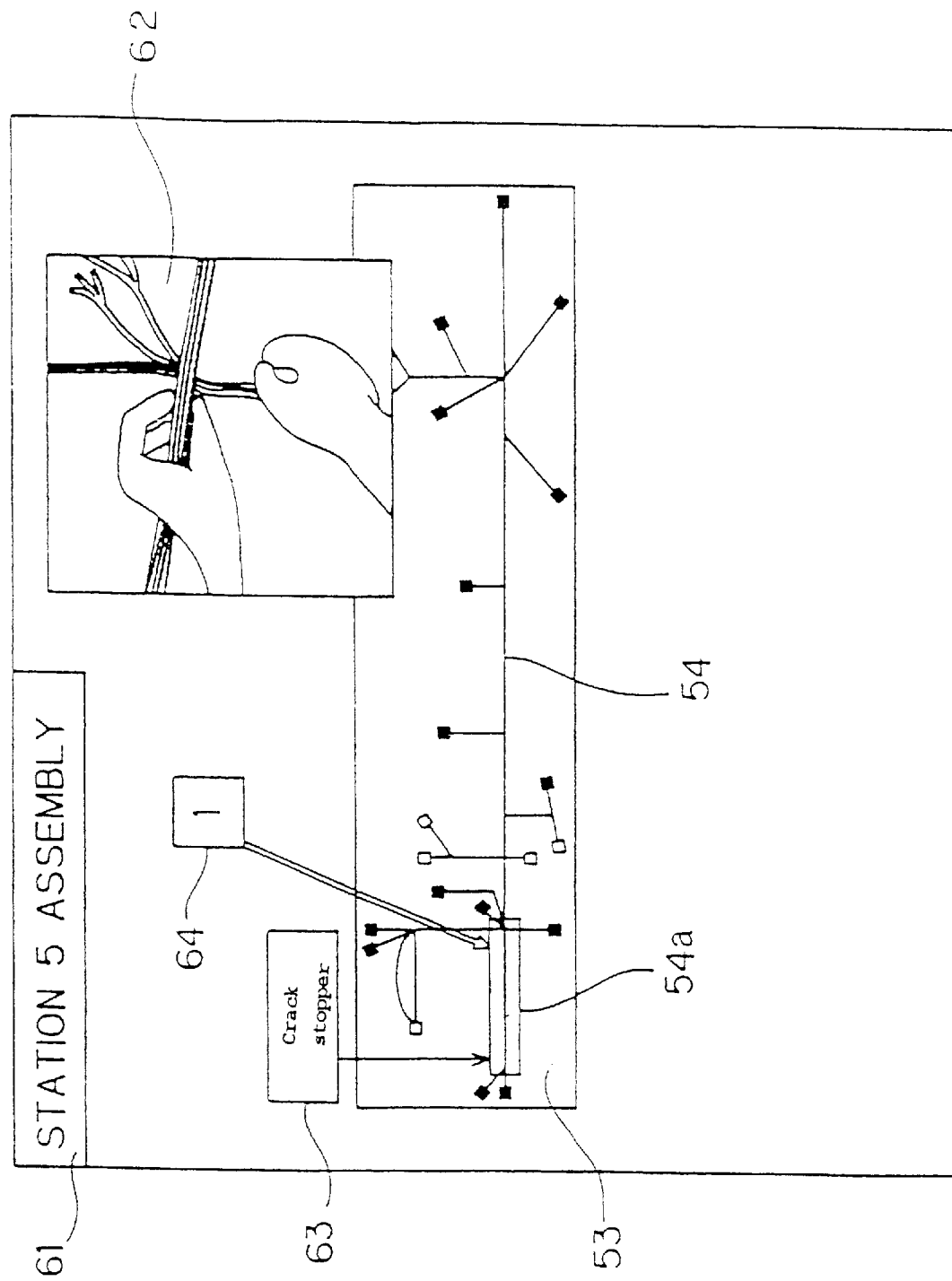

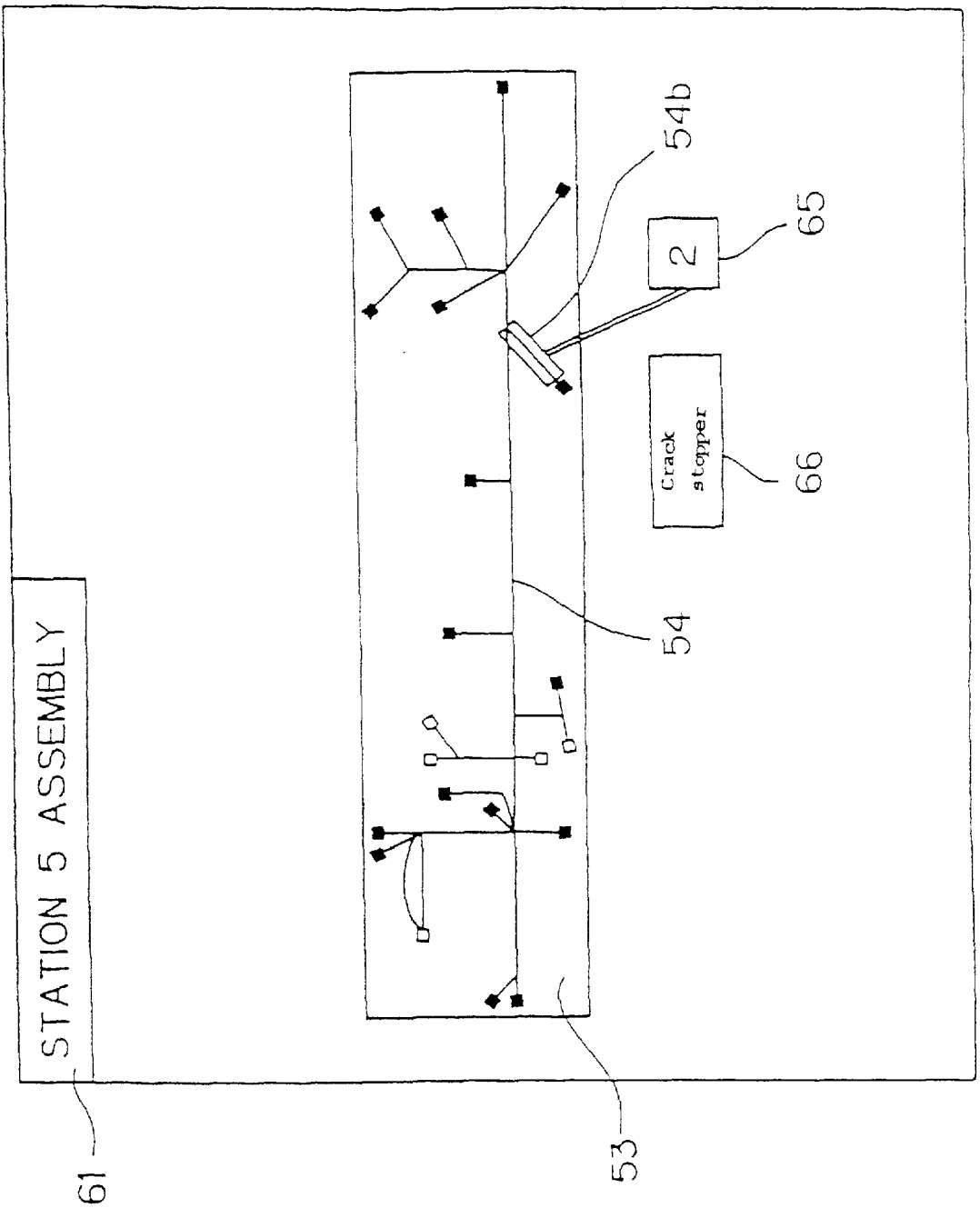

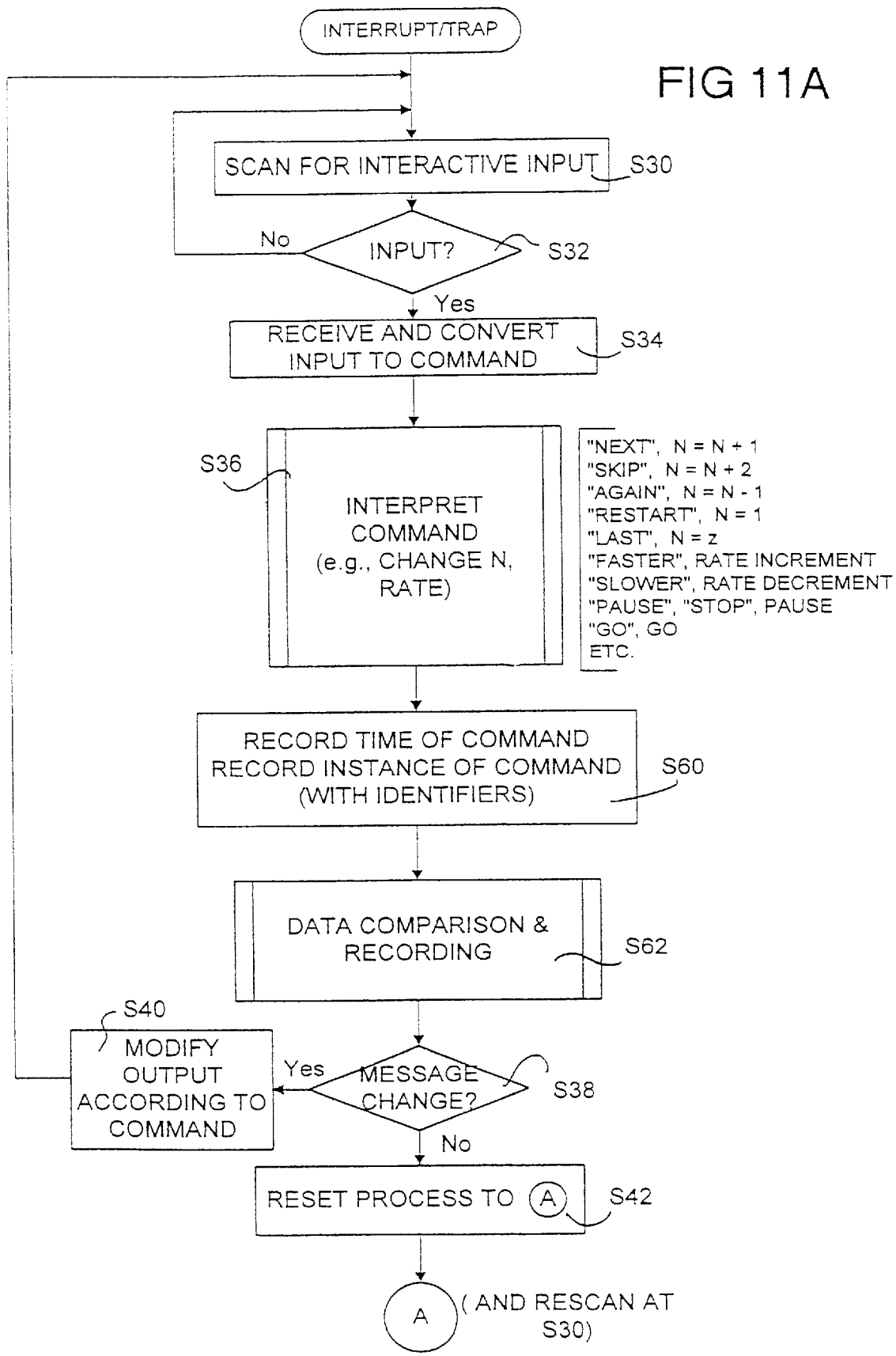

ASSEMBLY WORK SUPPORT SYSTEM

CROSS-REFERENCE TO RELATED APPLICATIONS

The present application claims priority under 35 U.S.C. § 119 of Japanese Patent Application No. HEI 10-337344, filed on Nov. 27, 1998, the disclosure of which is expressly incorporated by reference herein in its entirety.

BACKGROUND OF THE INVENTION

1. Field of the Invention

The present invention relates to an assembly work support system that provides instructions from the system to the worker regarding work procedures, work contents, and particular instruction points, and receives information from the worker. The work support system may be employed in a process for assembling wire harnesses.

2. Description of Relevant Materials

Conventionally, in some types of assembly line (e.g., in assembling wire harnesses), several assembly diagram boards are conveyed on a conveyor apparatus at a certain speed. As the assembly diagram boards are conveyed to the work stations of individual workers, each worker undertakes a designated set of tasks.

For example, the conveyor assembly line may be employed in the case of a wire harness, which is constituted by bundling a plurality of electric wires. From different locations along the bundle, one or more wires diverge from a "main" bundle, and connectors are fixed to both ends of the main bundle and to the ends of the diverging wires as well. Further, clamps, grommets, corrugated tubes, identification tape, and the like are fitted at predetermined positions. In the conveyer assembly line as noted above, in the case of a wire harness, the arrangement of wires to the assembly diagram board, insertion of terminals into connectors, winding tape on arranged wires, or clamping of the clamp parts onto the arranged wires is undertaken at the different work stations.

An explanation of the step(s) or instruction(s) to be performed at a work station, whether concrete work procedures, work contents, or instruction points, is usually provided in the form of written documents including diagrams or text that are intended to facilitate a worker's understanding of the work to be performed. However, with written documents, it is necessary that the workers simultaneously perform their own work while reviewing the documents including the drawings or text, which is difficult and time-consuming.

In addition, workers that are new to a particular assembly routine need to be trained before being permitted to take their place in the line. However, with written training instructions, the worker does not obtain the same familiarity with different parts and procedures as would be obtained by practicing the actual assembly. Moreover, if the assembly routine learned by the worker is erroneous (for any reason), both parts and time will be wasted if the worker takes his or her place on the line and then performs an erroneous assembly routine, perhaps repeatedly.

If an actual production line and actual parts are necessary for training and practice, workers in the locale in which a facility is to be built, or in an existing facility to which a new production line or routine is to be started, cannot be trained before their exposure to the actual line. In such a case, resources are wasted in training on a line that could be in production, and errors that occur even after the actual line becomes available for full production.

Still further, it is an accepted fact that instructions and training will often tend to generate mistakes when new or different instructions and training are employed, for example, by virtue of the differences between the training designer's perceptions and the perception of various individual workers. It is also accepted that individual workers have differing "quality" in the form of, e.g., efficiency or skill, and that unanticipated bottlenecks and flow disparities will occur in any work flow design. However, it is difficult to keep track of these factors without imposing a significant monitoring burden in time and effort expended, both on the overall process and on the workers themselves.

Provisions for training and for work support are generally distinct from one another. When a change is made to, for example, training provisions (e.g., by changing content or appearance of documents), there is a constant risk that the change will not be propagated to the work support provisions, and vice versa. Monitoring two-way compliance is a significant burden on any such system. Moreover, facility and support costs are high in view of redundancies and duplication between the discrete and distinct provisions.

Additionally, training and work support provisions in the form of written documents need to be wholly localized to every national language in which the assembly workers must learn and work. Essentially identical assembly routines (along with their necessary facilities) are moved to or initiated in different countries, all of the written documents for training and work support must be localized, which is expensive and increases the risk of mistakes and inconsistencies between different facilities.

Although there is known an inspection support system for a wire harness, for conveying inspection instructions by synthesized voice to the worker by a speaker (Japanese Patent Laid-open Publication HEI 8-271570), assembly instructions and inspection instructions have different requirements, and a synthesized voice alone is not usually sufficient to provide complicated assembly instructions to a worker.

SUMMARY OF THE INVENTION

Accordingly, an object of the present invention is to provide a work support system with which improvement of work efficiency can be expected by adopting a visual system for assembly work support. That is, to cope with the above shortcomings in the conventional support systems, the invention envisions a system to relate instructions of the work content to be carried out by moving pictures or still pictures on a monitor, instead of written documents as conventionally practiced.

According to a first aspect of the present invention, an assembly work support system includes memory storage from which instruction data for processing an assembly is readable. A converter, in response to a work start signal, reads the instruction data and converts the instruction data into an output signal that includes one or both of a voice signal, an image signal. A terminal receives the output signal and outputs corresponding assembly messages to an operator, and the system includes an operator input device adapted to receive interactive input data from the operator. A controller receives the interactive input data from the operator input device and interprets the interactive input data.

If a system employing moving or still pictures is adopted, a system for training and simulated practice of assembly work allows the worker to respond to the instructions through feedback, e.g., manipulation of a mouse before exposure to a production line—that is, before the worker is permitted to join the line, or even before the production line actually exists at the worker's locale. According to this assembly training and simulated practice system, even without the actual parts to be assembled or diagram boards for assembly, it becomes possible to train a worker to a high degree of proficiency.

When such an assembly practice system is used in combination with feedback or work confirmation provided in the actual assembly line (e.g., by means of a sensor, or in which the worker can convey information to the system by operation or voice), the work support system then becomes easy to understand, very strongly relates the training and simulated practice to actual work, and permits the confirmation of work progress and the prevention of erroneous fitting of parts is realized.

Still further, in this manner, employing actual or schematic representations of all of the parts and routines in an assembly process removes any necessity for workers to read text, and the system can be made into a standard form which may be employed anywhere in the world. Any need to localize textual instructions to suit different national languages, e.g., in plants in foreign nations, can be eliminated.

The operator input device may include a microphone for receiving spoken commands as interactive input data, in which case the controller includes a voice recognition system for converting each spoken command into a command that controls output of the assembly messages. Further, the operator input device may include a wireless transmitter worn by an operator for transmitting the spoken commands as interactive input data. Alternatively, the operator input device may include a depressible button, such as a mouse button for receiving each manual actuation or operation as interactive input data.

The instruction data may include step by step work sequence instructions for processing an article. In this case, the memory storage may include a plurality of memories. The memories separately store work content items cross-referenced to articles, one or more instruction for each work content item, and auxiliary data corresponding to the instructions. Each instruction may include one or more of visual layouts of symbolic information and audio voice signal information. The auxiliary data optionally includes a photograph of a part; motion video of an operator performing an instruction; and/or a schematic image of an assembly diagram board.

The terminal may include a voice synthesizing apparatus, in which case the convertor converts the instructions into synthesized voice audio signals as assembly messages.

The convertor may read the instructions from the memory storage in a predetermined sequence at a predetermined rate, and may change one or more of the sequence or the rate depending on the interpreted interactive input data.

In another aspect of the present invention, an assembly work support system controller connectible to an output terminal includes memory storage from which instruction data for processing an assembly is readable. A converter that, in response to a work start signal, reads the instruction data and converts the instruction data into an output signal that includes one or more of a voice signal and an image signal. A network transmission apparatus transmits the output signals to the terminal and that receives interactive input data from the terminal. The terminal receives the output signal and outputs corresponding assembly messages to an operator. The system includes an operator input device adapted to receive interactive input data from the operator. A controller receives the interactive input data and interprets the interactive input data.

In this aspect, the convertor reads the instruction data in a predetermined sequence at a predetermined rate, and the controller changes one or both of the predetermined sequence and said predetermined rate depending on the interactive input data.

In a further aspect of the invention, an assembly work support system includes memory storage from which instruction data for processing a wire harness is readable. A converter reads the instruction data and converts the instruction data into an output signal that includes one or more of a voice signal and an image signal. A terminal receives the output signal and outputs corresponding assembly messages to an operator, and an operator input device receives interactive input data from the operator. A controller receives the interactive input data from the operator input device and interprets the interactive input data to control the output of the assembly messages according to the interactive input data.

Accordingly, the inventor contemplates that the assembly work support system may include both of a training and simulation mode and a work-support mode, each alone or in combination, in which the operator may control the voice or display output by interactive input.

In still another aspect of the invention, a wire harness assembly work support system includes memory storage from which instruction data for processing a wire harness is readable. A converter reads the instruction data and converts the instruction data into an output signal that includes one or more of a voice signal and an image signal. A terminal receives the output signal and outputs corresponding assembly messages to an operator, and an operator input device receives interactive input data from the operator. A controller receives the interactive input data from the operator input device and interprets the interactive input data, and a database stores the interpreted interactive data.

In this case, the controller may interpret the interactive input data and record, in the database, operator efficiency and performance by comparing at least operator step completion times to a threshold step completion time. Alternatively or in addition, the controller may interpret the interactive input data and record, in the database, instruction quality by comparing at least a number of repetitions of requested instruction data to a threshold number of repetitions of requested instruction data. Further alternatively or in addition, the controller may interpret the interactive input data and record, in the database, work flow quality by comparing at least waiting times and instruction completion times to threshold waiting times and instruction completion times.

According to yet another aspect of the present invention, a wire harness assembly work support method includes storing instruction data for processing a wire harness, and reading the instruction data. The instruction data is converted into an output signal that includes one or more of a voice signal and an image signal. The output signals are received and corresponding assembly messages are output to an operator. Interactive input data is received from an operator. The interactive input data are evaluated for predetermined characteristics. Feedback is provided to the operator via a second output signal that includes one or more of a sound signal and an image signal.

According to still yet another aspect of the present invention, an assembly work support system includes (first)

memory storage from which training instruction data describing processing of an assembly is readable. A simulation terminal reads the training instruction data and outputs corresponding assembly training messages that include one or more of voice signals and image signals to an operator. The system includes an operator input device adapted to receive interactive input data from the operator. A training controller receives the interactive input data, interprets the interactive input data, and controls the output of the assembly training messages according to the interactive input data. A simulation controller receives the interactive input data, evaluates the interactive input data for predetermined characteristics, and provides feedback to the operator via an output signal that includes one or more of a sound signal and an image signal.

Thus, the inventor contemplates a training assembly work support system that accepts interactive input from the operator in the form of user-interactive control of his or her review of processes to be learned, where the training assembly work support system includes a simulation mode that gives feedback messages to the operator that indicates whether or not the operator's simulated performance of the simulated tasks is sufficient. At least a teaching portion in which multimedia instructions include distinct multimedia characteristics (such as video clips embedded in work diagrams) is included, as well as simulation exercises with feedback, e.g., positive (beeps) and negative feedback (buzzes) when the worker/trainee performs simulated tasks.

In a further aspect of the present invention, an assembly work support system includes memory storage from which instruction data for processing an assembly is readable, and a converter that reads the instruction data and converts the instruction data into output signals that include one or more of voice signals and image signals. A simulation terminal receives the output signals and outputs corresponding assembly training messages to an operator, a first operator input device receives first interactive input data from the operator, and a simulation controller that receives the first interactive input data and interprets the first interactive input data to provide training feedback to the operator. A work control terminal receives the output signals and outputs corresponding assembly messages to an operator, a second operator input device receives second interactive input data from the operator, and a work control controller receives the second interactive input data and interprets the interactive input data.

In this case, the work control controller may record the second interpreted interactive input data in a database. Further, the work control controller may interpret the second interactive input data to control the output of the assembly messages according to the second interactive input data.

Accordingly, the inventor contemplates a central processor or server that gathers work flow data and evaluates the data, in some cases for the ultimate purpose of modifying work flow and process design. In this case, data may be collected that ultimately become work flow data, for example, for evaluating operator efficiency/performance; for evaluating whether the instructions are well designed (if many operators request review of the same process step); and/or for identifying unnecessary waiting and bottlenecks, i.e., in order to improve assembly line balance.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 4B is a flow chart describing an interactive interrupt/trap routine for capturing operator interactive input and interpreting the same, and that further changes the behavior of the routine of FIG. 4A;

FIG. 5 shows an assembly message output in the form of a screen view, showing a graphical representation of an outline of parts and wire connection work to be performed to connect a relay box and connector;

FIG. 6 shows an assembly message output in the form of a screen view, showing a further graphical representation of the outline of parts and wire connection work to be performed to connect a relay box and connector;

FIG. 7 shows an assembly message output in the form of a screen view, showing a graphical representation of the outline of parts and wiring work of the connector;

FIG. 8 shows an assembly message output in the form of a screen view, showing a graphical representation of the outline of parts and procedure for bundling the wire harness; and FIG. 9 shows an assembly message output in the form of a screen view, showing a further graphical representation of the outline of parts and procedure for bundling the wire harness.

FIG. 11A is a flow chart describing an interactive routine for generating work assembly messages and outputting the messages to an operator;

DETAILED DESCRIPTION OF THE PREFERRED EMBODIMENTS

The particulars shown herein are by way of example and for purposes of illustrative discussion of the embodiments of the present invention only, and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
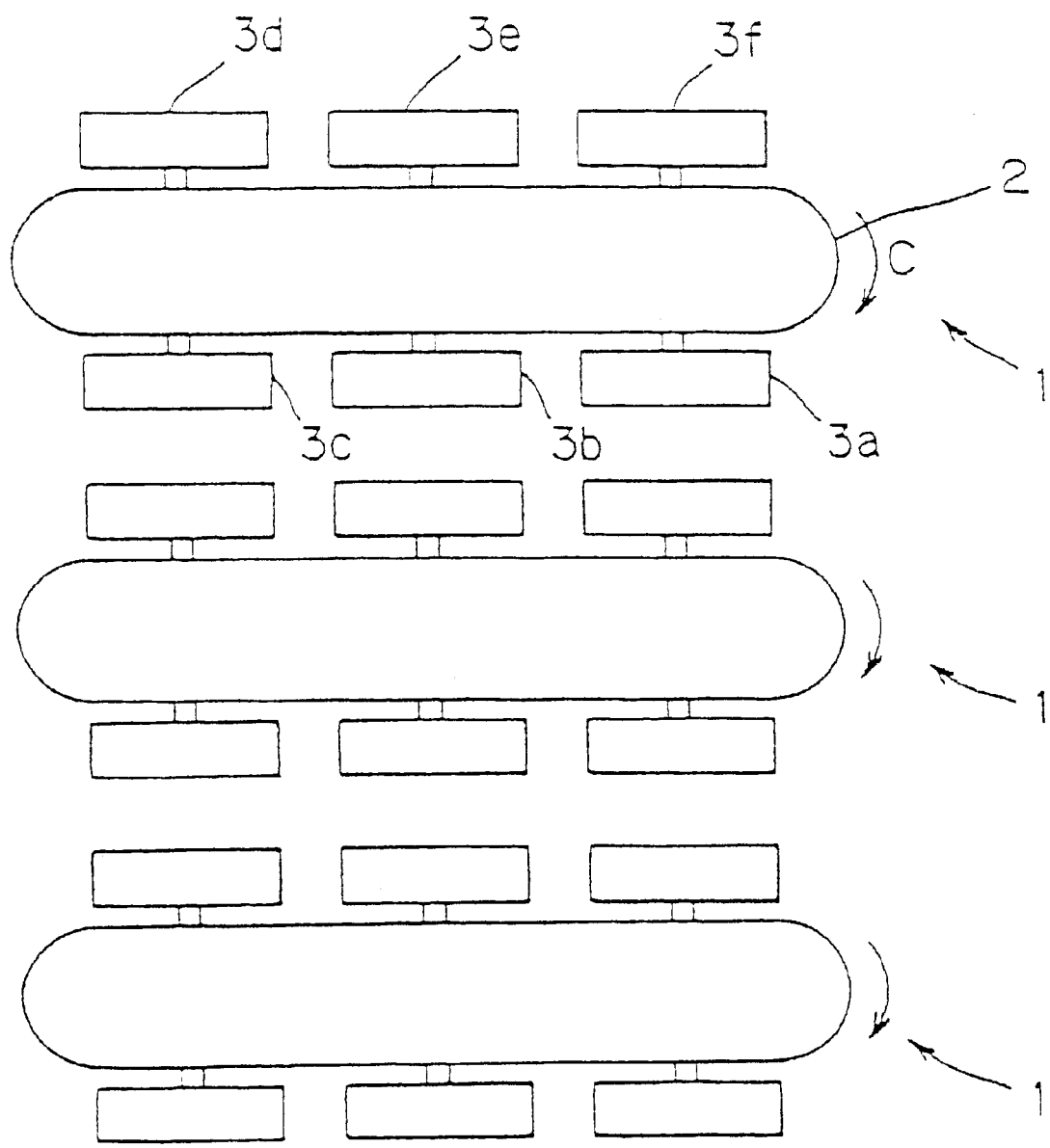
FIG. 1 is a schematic constitution view of an assembly line, the assembly line of FIG. 1 being suitable for wire harness assembly.

FIG. 1 is a schematic constitution diagram of a wire harness assembly line for assembling wire harnesses, and an example of the work support system according to the invention may be used in the assembly line of FIG. 1. In FIG. 1, a plurality of assembly lines may be provided, for example, three assembly lines 1 as shown in FIG. 1. Although the following explanation refers to only one assembly line 1, each assembly line 1 is constituted in a similar manner.

The assembly line 1 includes an "endless" conveyor 2 having a moving member (such as a belt). Several assembly diagram boards 3a–3f are connected to the moving member to be conveyed therewith. The moving member and respective assembly diagram boards 3a–3f (herein generically referred to as an "assembly diagram board 3") are moved slowly by the conveyor 2 in the direction of the arrow C. In the course of the movement from a predetermined position in the assembly line 1 to another predetermined position, e.g., from the position of assembly diagram board 3a in FIG. 1 to that of the assembly diagram board 3f, wire harnesses are assembled on the moving assembly diagram boards 3 by workers according to a predetermined work flow. For example, in FIG. 1, at the position corresponding to the assembly diagram board 3a, a first part of the assembly process is performed, e.g., placing a partial assembly (sub-assembly) of a wire harness on the assembly diagram board, and at the position corresponding to assembly diagram board 3f, a final part of the assembly process is performed, e.g., an appearance inspection process for the completed wire harness is carried out.

Figure 2:
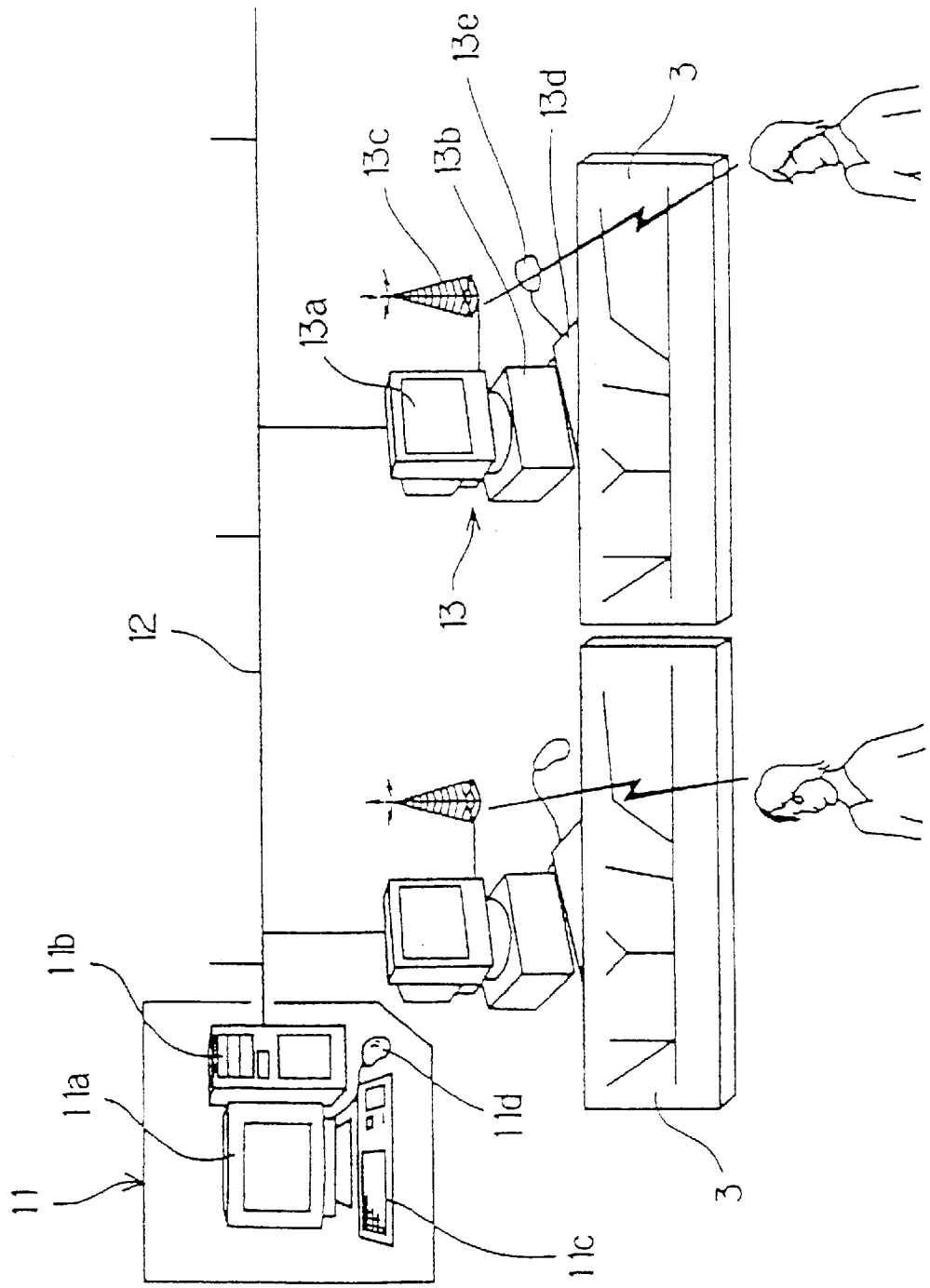
FIG. 2 is a schematic constitution view of a work support system, also suitable for wire harness assembly.

FIG. 2 shows a further schematic diagram of the assembly work support system, particularly with respect to wire harnesses. The work support system includes a plurality of terminals 13 connected to a central control apparatus 11 through an in-site communication line or network 12. The central control apparatus 11, acting as a server, carries out central control of all of the assembly lines 1. The central control apparatus 11 is provided with a display device 11a, a processing apparatus 11b, a keyboard 11c, a mouse 11d, all of which function in a known manner except as set forth herein. Each terminal 13 is used by a worker, and is provided with a display device 13a, a processing unit 13b, a keyboard 13d, and a mouse 13e, all of which function in a known manner except as set forth herein. As shown in FIG. 2, each terminal may also be provided with an antenna 13c for wireless communication with a transceiver 38 (as shown in FIG. 3B) by a worker.

Figure 3A:
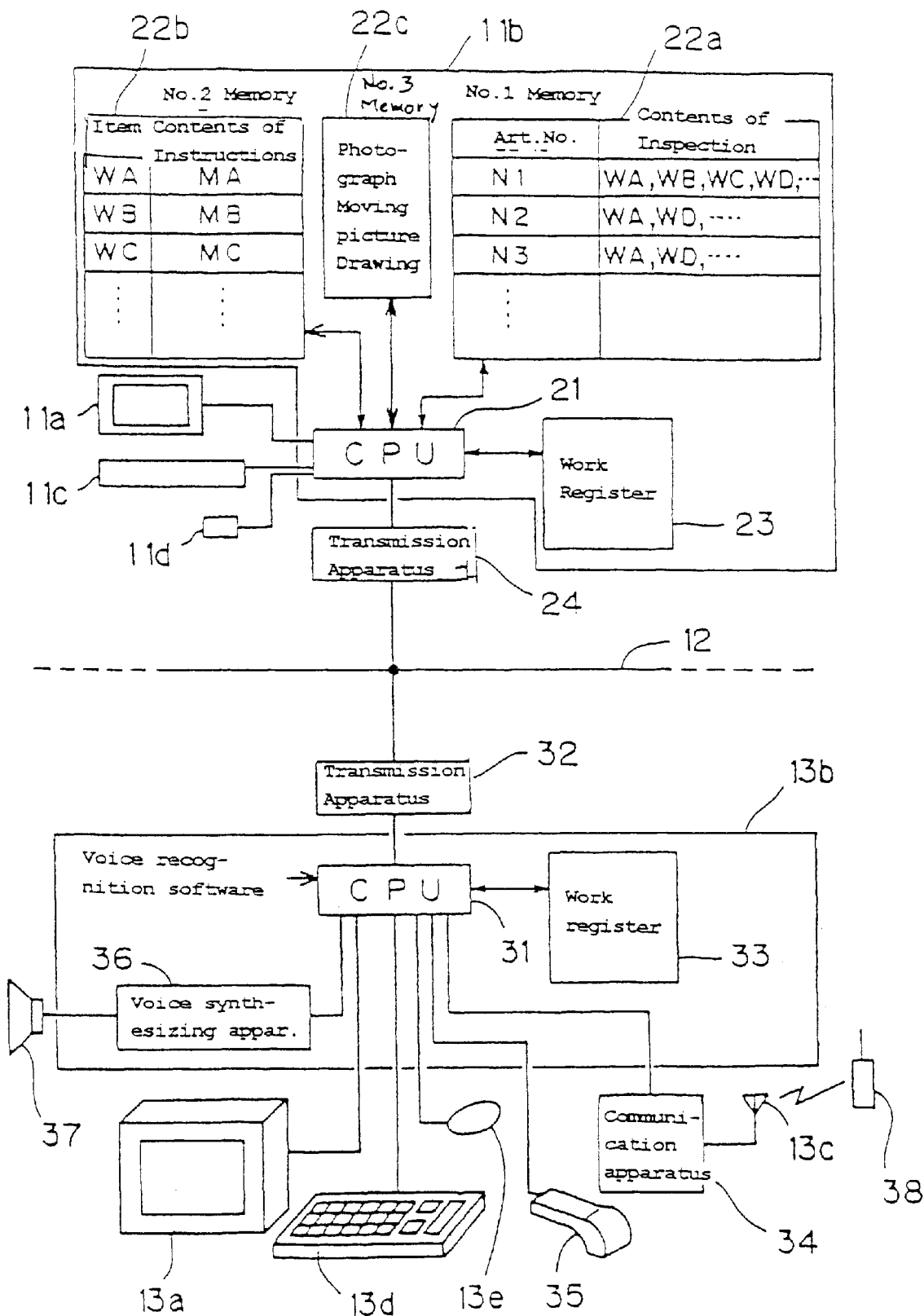
FIG. 3A is a block diagram showing detail of a central control apparatus and terminal apparatus suitable for use as the work support system.
Figure 3B:
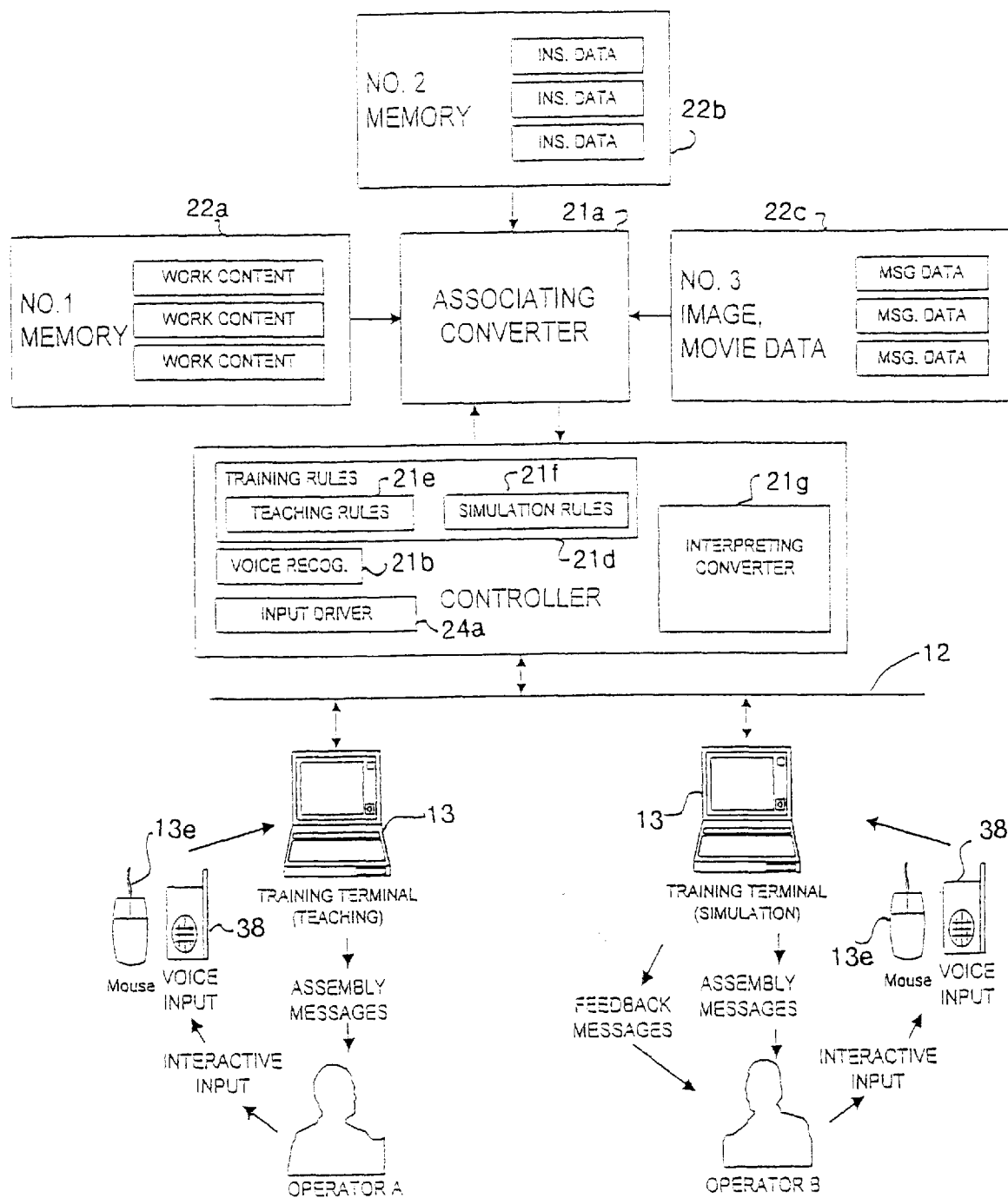
FIG. 3B is a block diagram showing a training and simulation configuration of the work support system.

FIG. 3A shows a block diagram of the central control apparatus 11 and the terminal apparatus 13 of FIG. 2. A processing apparatus 11b of the central control apparatus 11 includes a first (No. 1) memory 22a, a second (No. 2) memory 22b, a third (No. 3) memory 22c, and a work register 23. A transmission apparatus 24 for connection to the in-site communication line 12 is also connected to the processing apparatus 11b. As previous indicated with respect to FIG. 2, a display device 11a, keyboard 11c, and mouse 11d are also connected to the processing apparatus 11b.

Concrete information relating to the work processes is stored in the first memory 22a, the second memory 22b, and the third memory 22c. In particular, the first memory 22a stores a data table having a list of work content items W# to be performed for each of several articles N1, N2, etc. For example, for a first article N1, sufficient memory is reserved to store a list of work content items WA, WB, WC, WD, etc., in order, the list describing all the work content items to be performed with respect to the first article N1. Similarly, for the second article N2, sufficient memory is reserved to store a different list of work content items WA, WD, etc., in order, this (different) list again describing all the work content items (some of which may be the same as other articles) to be performed with respect to the second article numbered N2. A list of work content items is provided for every article.

The second memory 22b stores a data table having specific instructions MA, MB, etc. for each of the work content items WA, WB, etc. The third memory 22c stores, for every specific instruction MA, MB, etc., auxiliary data corresponding to the contents of the instructions MA, MB, etc. The "auxiliary data", for each instruction, takes the form of at least moving pictures of work procedures and/or schematic diagrams of assembly diagram boards. The moving pictures of work procedures depict, for example, an actual worker performing a work procedure corresponding to that particular instruction. The specific instructions MA, MB, etc., each include a layout of arrows, numbers, codes, marks, and/or text which is used for instructions displayed on a screen, voice signals corresponding to the instructions, and markers pointing to the corresponding auxiliary data. Accordingly, the first, second, and third memories 22a–22c together, or subsequently the work register 23 alone, store the contents of instructions for processing the article (e.g., wire harness), such as an item by item work sequence.

In a preferred embodiment, the moving pictures are compressed digital video files (e.g., QuickTime, MPEG, or other digital video), while the schematic diagrams of assembly diagram boards take the form of vector graphic and/or vector animation files (Macromedia Flash or Director, etc.).

The processing unit 13b of each terminal apparatus 13 includes a CPU 31 for overall control, a work register 33, and a voice synthesizing apparatus 36 for converting any voice signal instructions included in specific instructions MA, MB, etc. to be output as "spoken" instructions via a speaker 37. The voice synthesizing apparatus 36 may function using, e.g., phoneme codes included in specific instructions MA, MB, etc., or by recalling recordings from specific instructions MA, MB, etc. or auxiliary data related thereto. Voice recognition software that translates spoken instructions into commands recognizable by the control program (e.g., IBM's "ViaVoice" or others) can also be used for interactive input to the processing unit 13b.

A display device 13a, an antenna 13c, a keyboard 13d, a mouse 13e, a transmission apparatus 32 (e.g., network interface), and the speaker 37 for conveying the converted voice ("spoken") signal to the worker are connected to the processing apparatus 13b. Further, a communication apparatus 34 as provided for receiving interactive input (such as the worker's voice as voice signal as described below) via an antenna 13c; as well as a bar code reader 35, for example, for identifying an article number N1, N2, etc. of a wire harness or parts from a code affixed thereto, are also connected to the processing apparatus 13b. The terminal 13 reads out the contents of the "instructions" stored in the work register 33 in response to the input of a work start signal from the worker, and converts the contents of instructions into, e.g., voice signals or image signals. At least the display device 13a and/or speaker 37 outputs the converted voice signals or image signals to the worker.

When interactive input includes input in the form of spoken input to be interpreted by the voice recognition software, the worker may carry a transceiver 38 for communicating with the communication apparatus 34 via the antenna 13c. The transceiver 38 transmits to the processing apparatus 13b the worker's interactive input (or "instructions") in the form of voice messages, such as, for example, "repeat once again", "give the next instruction", "return to the first step", and similar messages. As noted above, the processing apparatus 13b can work in conjunction with conventional voice recognition software that converts the interactive voice input from the worker into data recognizable by the processing unit 13b. The system thereby carries out work control based on the instructions from the operator.

It should be noted that other voice transmitting means may be employed instead of the transceiver 38, such as a portable telephone unit, PHS, and the like. Moreover, the medium for transmitting the worker commands or interactive input is not limited to a hand-held and/or hand-portable unit, but may be a microphone incorporated in a headset in cooperation with a wireless apparatus. When a headset is used, the earphones or headphones of the headset may be used in lieu of the speaker 37.

Accordingly, as noted, voice signals based on the worker's voice may be transmitted to the terminal 13, wherein the CPU 31 recognizes the transmitted voice, and performs work control based on the recognition result. Alternatively or in addition, operation signals based on the worker's operations (e.g., mouse clicks or keyboard actions) may be transmitted to the terminal 13, wherein the CPU 31 recognizes the transmitted operation contents, and performs work control based on the recognition result.

FIG. 3B is a block diagram showing a training and simulation configuration of the work support system. It should be noted that the configuration shown in FIG. 3B is more schematic than that depicted in FIG. 3A, and that one skilled in the art would recognize how portions of each configuration relate to one another. Moreover, the configuration shown in FIG. 3B does not necessarily employ a work register 23 or 33.

FIG. 3B depicts an assembly work support system similar to that of FIG. 3A, but in which provisions for both training and simulation (e.g., practice or testing) are provided. Training instruction data describing processing of an assembly is readable from the memories 22a, 22b, and 22c as previously described. Since the order and contents of the work content items and instructions, as well as the corresponding multimedia elements, are determined by the article number as previously set forth, the system may optionally employ a work register 23 or 33, or may read and output each assembly message "on-the-fly". Training and simulation terminals are substantially identical, but differ based on how the system treats the terminal. Two training terminals 13 are shown in FIG. 3B. Each training terminal 13 is connected to the central processor 21 of the central control apparatus, and reads training instruction data from the memories 22a, 22b, 22c via the central processor 21. The training terminals 13 output corresponding assembly training messages that include one or both of voice signals and image signals to the worker or operator. The terminals 13, especially in the training context, may be any kind of display, such as that of a notebook personal computer. A head-up display or headset "VR" goggles such as Sony's "Glastron" is particularly beneficial for the combination of high resolution, portability and hands-free operation. An operator input device is provided in the form of one or both of a mouse or a transceiver 38 (or alternatives thereto), and the controller 21 communicates with the terminals via a transmission apparatus in the form of one or more input drivers 24a. The operator input devices 13e, 38 are adapted to receive interactive input data from the operator in the form of voice input, mouse clicks, and/or keyboard input as described herein.

It should be noted that although the training terminals 13 are shown connected, via the network 12 to the central control apparatus, as described herein, the training terminals may be, in an alternative embodiment, disconnected from the network 12 once assembly messages are downloaded thereto. In this manner, the training terminals 13 may take the form factor of notebook computers.

The controller 21, in combination with training rules 21d, teaching rules 21e, and simulation rules 21f, is a training controller, and holds "rules" for both teaching and simulation. The controller 21 receives the worker's interactive input as data from the interactive input devices 13e and 38, interprets the interactive input data at least, e.g., by means of an interpreting converter 21g carrying out a process as set forth with respect to FIG. 4B, and controls the output of assembly training messages according to the interactive input data, e.g., as set forth in FIG. 4B.

The teaching rules 21e restrict the communication between the operator and the system to that shown with respect to Operator A in FIG. 3B, i.e., assembly messages are directed to the worker, and the worker may provide feedback that determines the manner in which the assembly messages are output as set forth in FIGS. 4A and 4B below. The simulation rules permit further communication between the operator and the system as shown with respect to Operator B in FIG. 3C, i.e., communication as with teaching is permitted, but additionally, the system provides feedback to the user.

The simulation rules 21f include, e.g., coordinate maps and graphics that act as overlays for the graphic and image output on the screen of the training terminal 13, and part and task information corresponding to the coordinate maps, as well as associations between parts and tasks to be taken therewith. The simulation rules 21f preferably employ an interrupt process analogous to that of FIG. 4B, and when a worker, upon viewing or reviewing the assembly messages corresponding to each instruction, indicates by means of interactive input (such as a touch-screen or mouse 13e click at a portion of the coordinate map) his or her intent to simulate the task set forth by the assembly message, the simulation rules interpret such action.

For example, the simulation rules 21f may set forth that, following the output of three assembly messages in a row that indicate wire wrapping of a harness, the worker will be tested. Showing the same image as employed for the teaching rules (which, of course, is obtained from the memories 22a, 22b, and 22c as indicated herein), the simulation rules then specify that an icon depicting a tape roll will be shown on the screen of the terminal 13, and the worker instructed to move the tape roll by means of interactive input such as a mouse 13e "drag-and-drop" of the tape roll icon to the locations to be wire wrapped, in order, to be followed by interactive input such as a spoken "done" that the worker has finished the assigned tasks. The simulation rules 21f then specify that the worker's interactive input, e.g., determined from the coordinate map, is to be compared to the proper activities as stored in memories 22a, 22b, and 22c. Feedback messages are also set forth in the simulation rules 21f, in both "correct" and "incorrect" categories. For example, where the worker has indicated that he or she is "done", yet has not "taped" all of the proper locations, an "incomplete" feedback message, that requires another attempt, may be specified. Where the worker has indicated taping a location, e.g., location 54*b* (as shown in FIG. 9) out of order, an "out of order" feedback message, that also requires repetition, may be specified. Where the worker has indicated "taping" a location that should not be taped at all, such may also be specified as a feedback message. A feedback message for a correct performance would also be provided (e.g., spoken "correct").

Teaching rules 21*e* may be distinguished from simulation rules 21*f* in that although essentially the same assembly messages are output and the operator or worker may provide interactive input that controls the response of the training system (e.g., to review, skip, change the speed of portions of the output as noted herein with respect to FIG. 4B) in both sets of rules, the simulation rules 21*f* include the above-described set of evaluative and feedback provisions for the system to respond to the operator's interactive input in a manner that provides practice and testing. That is, the simulation rules 21*f* create a practice and testing environment in which the operator, instead of merely watching or listening to the order and manner of assembly processes to be carried out, attempts to carry out the assembly processes in a simulated manner and is provided with feedback as to, e.g., proper order, correctness or completeness.

In this regard, the controller 21, in combination with the simulation rules provided therein, is a simulation controller that receives the interactive input data, evaluates the interactive input data for predetermined characteristics such as correctness (whether or not the operation "performed" by the worker is correct or in order) and completeness (whether or not the worker has "completed" all the necessary operations to proceed to the next operation). The controller 21 provides (e.g., correctness or completeness) feedback to the operator via an output signal, that includes one or both of a sound signal and an image signal.

That is, in carrying out assembly work support (e.g., in the case of the wire harness) instruction data for processing a wire harness are stored in the memories 22*a*, 22*b*. The instruction data are read by the controller 21, are associated with the multimedia content stored in memory 22*c* and/or converted by the controller 21 into an output signal that includes one or both of a voice signal and an image signal. The terminal 13 receives the output signals and, in the case of both the teaching rules 21*e* and simulation rules 21*f*, outputs corresponding assembly messages to an operator or worker, and receives interactive input data from the operator by means of, e.g., a mouse 13*e* or transceiver 38. In particular, as noted above, the controller 21 receives interactive input data from the operator input device and interprets the interactive input data to control the output of assembly messages according to the interactive input data. Further, the controller 21, in combination with the simulation rules 21*f*, also may evaluate said interactive input data for predetermined characteristics (e.g., correctness or completeness), and provides (e.g., correctness or completeness) feedback to the operator in the form of feedback messages that can be considered a second output signal that again includes one or both of a sound signal and an image signal.

Figure 4A:
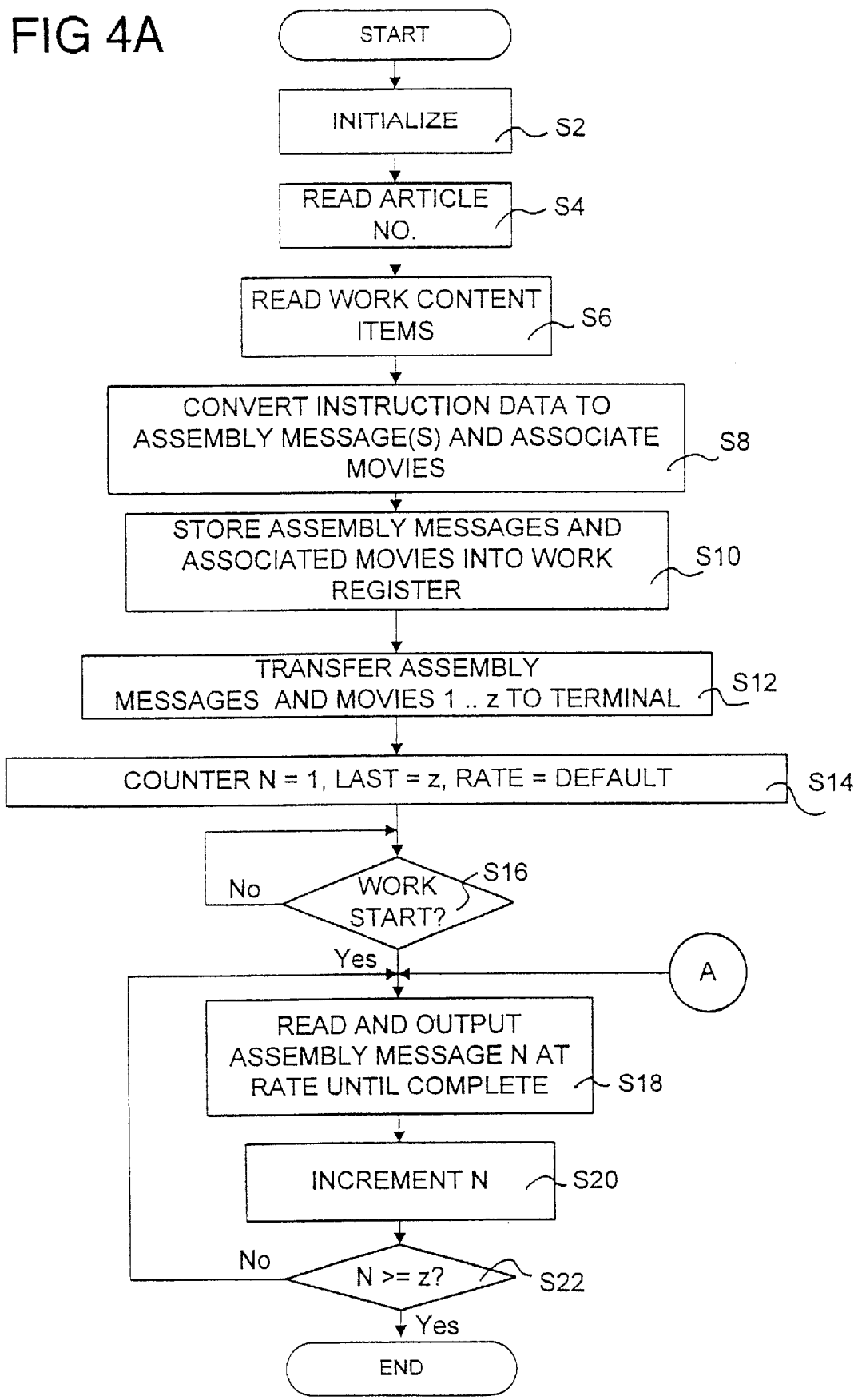
FIG. 4A is a flow chart describing an interactive routine for generating work assembly messages and outputting the messages to an operator.

FIGS. 4A–4B are flow charts describing an interactive routine for generating work assembly messages, outputting the messages to an operator or worker and capturing interactive input from the operator. FIGS. 5–9 depict exemplary screen output, for example, shown on the display 13*a* of the terminal 13 as the routines of FIGS. 4A and 4B are carried out by the processing unit 13*b* in combination with the central control apparatus 11. It should be noted that the interrupt routine of FIG. 4B, an interactive interrupt routine for capturing operator interactive input and interpreting the same, and that changes the behavior of the routine of FIG. 4A, operates concurrently with the routine of FIG. 4A and intercepts inputs to the terminal 13. Although the following description primarily discusses the operation of the embodiment shown in FIG. 3A, the operation of the embodiment of FIG. 3B should also be considered to operate as described herein, especially in the case of the teaching mode and system as described.

As shown in FIG. 4A, upon the start of the interactive routine carried out by the central control apparatus 11 and terminal 13, all necessary variables, flags, clocks, counters and timers are initialized, set, or reset in step S2. In step S4, the system obtains the correct article number N#, e.g., when a bar code having a representative article number N# is read into the system by the bar code reader 35. The reading of the bar code may act as a signal to proceed from step S6, and the bar code may be carried by the article to be assembled or by the assembly diagram board 3. In step S6, all of the work content items are read by the CPU 21 in preparation for association with auxiliary data and conversion into assembly messages as appropriate.

With reference to FIG. 3A, upon the input of article number data of an assembly board 3 or parts thereon (for example, an assembly board carrying a wire harness) as in step S4 of FIG. 4A, the CPU 31 of the terminal 13 conveys the article number to the CPU 21 of the central control apparatus 11 via the transmitting apparatus 32.

As noted above, in step S6, the work content items W# corresponding to the article number N# are read from the first memory 22*a*. For example, if the article number read out is "N1", the CPU 21 reads out the work content items corresponding thereto (WA, WB, etc.) in order from the first memory 22*a*.

A plurality of work content items W# are read out, and each work content item W#, corresponds to a group of instructions M# which will be stored to the work register 23. The groups of instructions M# and/or order for each will be different for different articles.

Figure 3C:
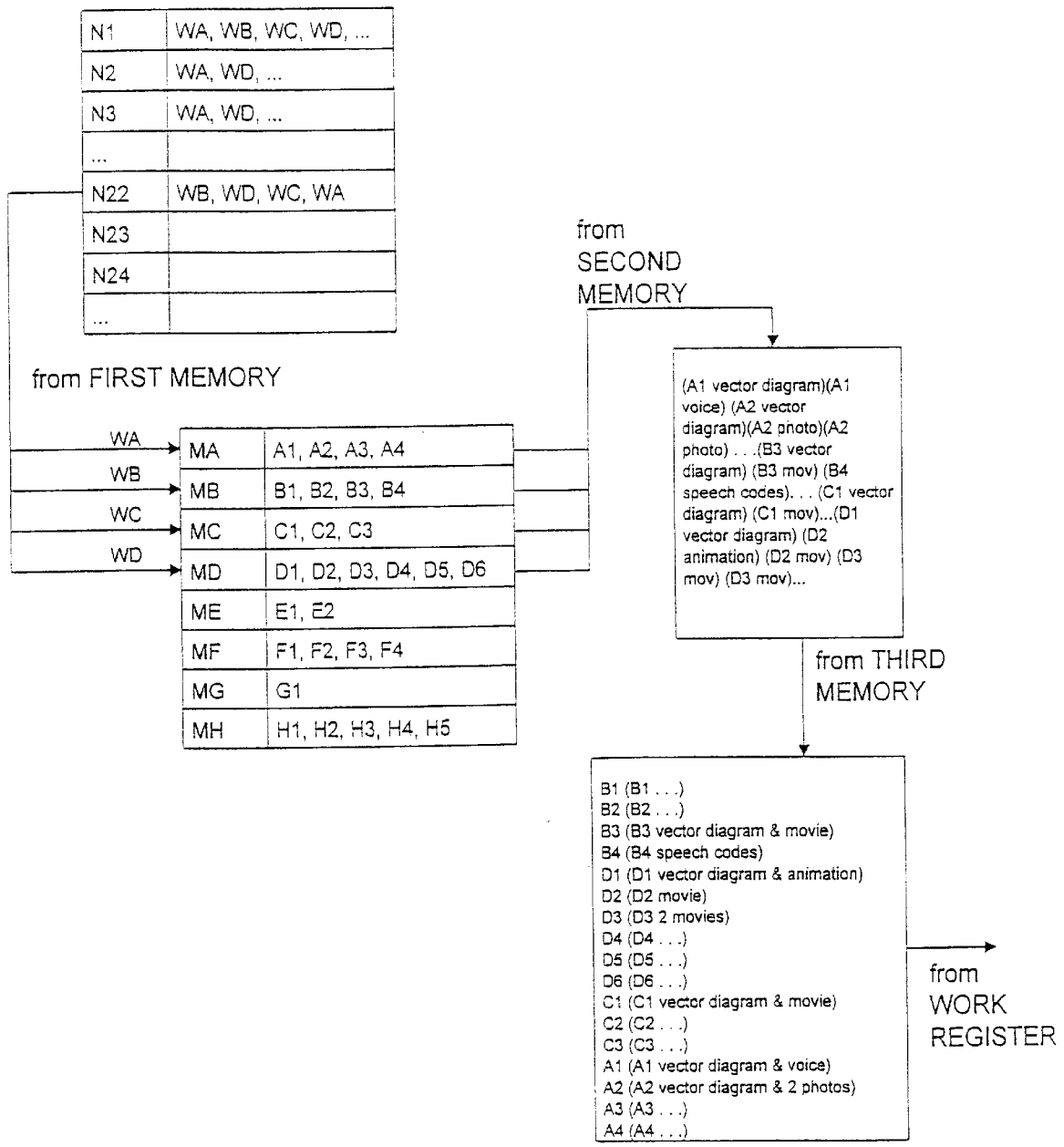
FIG. 3C is a data chart showing a relationship between article numbers, work content items, groups of instructions and/or assembly messages, multimedia content such as movies and digital images, and how the same are loaded into a work register for output.

Each instruction in each group of instructions is converted to assembly messages and/or associated in step S8 with the necessary multimedia content necessary to form the assembly messages, e.g., an instruction in text or code form may correspond to a bitmap or vector graphic image, photographic image, voice recording, as well as to a moving picture. FIG. 3C shows, in schematic form, a relationship between the first memory 22*a*, second memory 22*b*, third memory 22*c*, and work register 23. For example, as shown in FIG. 3C, if the article "N22" requires work content items WB, WD, WC, WA in that order, and each work content item W# includes the corresponding instruction groups M# (e.g., group MA including instructions A1, A2, A3, and A4 as text and/or codes such as control codes or speech synthesis codes), the instructions in MB, MD, MC, then MA are read from the second memory 22*b* in order, and matched with corresponding data and/or moving pictures ("MOV": movies, graphics, photographs, or sound recordings). As depicted, the third memory 22*c* stores auxiliary data at least in the form of digital moving pictures ("A1 mov", etc.) and also in other forms (including vector diagrams, voice recordings, speech codes for synthesis, digital images or photos, vector or other animations, or any other auxiliary data type discussed herein). Some instructions will have digital movies associated therewith, while others will not. In step S10, all of the data are stored in order as assembly messages, optionally along with the designated digital moving pictures, in the work register 23 of the central control apparatus 11. The assembly messages may be stored in the form of a combined video output including graphics and embedded motion video.

In other words, the CPU 21 reads out, and stores in the work register 23 of the central control apparatus 11, the contents of groups of instructions M# corresponding to the work content items W# in order from the second memory 22b, and the data of the related graphic data, photographs and/or moving pictures from the third memory 22b.

In the embodiment discussed herein, in step S12, the CPU 21 of the central control apparatus 11 sends the data to the terminal CPU 31 through the transmitting apparatus 21 in order of output, e.g., in order of display on the display device 13a and output to the voice synthesizing apparatus 36. The terminal CPU 31 stores the contents of instructions M# and/or related photographs or moving pictures in the predetermined region of the work register 33.

In the described embodiment shown in FIG. 3, a second work register 33 is provided at the terminal 13. In this regard, in step S12, the entire contents of the central work register 23 may be transferred to the terminal work register 33 via the transmission devices 24 and 32, in which case the terminal may wait until the entire contents of the central work register 23 are transferred before beginning output, or alternatively may wait only until an amount of the instructions and data sufficient to begin output are transferred before beginning output. Alternatively, only part of the contents of the central work register 23 may be transferred at a time (e.g., one instruction group M#),or the central work register 23 may store only part of the overall work contents at a time and transfer the work content items accordingly. Still further, the second work register 33 may be omitted from the terminal 13, which could then be provided with only sufficient memory to accept "streaming" output from the central control apparatus 11.

In step S14, general "housekeeping" values are set. For example, a counter N, which is used to keep track of the currently output assembly message, is set to "1"; a variable LAST is set to the total number of assembly messages for all of the instructions corresponding to the article number N# that was read out; and the rate at which assembly messages are output to the user is set to a default value (this rate is empirically determined, e.g., the rate at which most workers set the output of assembly messages).

Subsequently, in step S16, the routine waits for a work start signal by means of interactive input or otherwise, e.g., when the operator indicates readiness, or alternatively, automatically generated when an assembly diagram board 3 borne by the conveyor 2 arrives, according to the predetermined work flow, at the worker's position.

It should be noted that the circled "A" between steps S16 and S18 in FIG. 4A indicates a position to which the interrupt routine of FIG. 4B directs or resets the routine of FIG. 4A depending on received interactive input, to restart output of assembly messages at the beginning of a designated assembly message. In this regard, the system may, in a similar manner to the interrupt routine of FIG. 4B, also direct or reset the routine of FIG. 4A by smaller steps or intervals, e.g., essentially within the process carried out by step S18 as described below, to restart output of assembly messages at a designated position within an assembly message.

It should also be noted that assembly messages are associated with one another, and are not necessarily sequential, but may be designated to be output simultaneously, especially as described below, i.e., voice messages concurrently with displayed messages, and moving pictures concurrently or within still graphic images. In order to facilitate this output, association codes for associating one assembly message with another and time codes for independently starting assembly messages depending on elapsed time from the work start signal may also be stored in the terminal's work register 33.

In step S16, the terminal 13 outputs the group of assembly messages in the work register 33 at the predetermined rate until the assembly message is complete.

In other words, based on the work start message, e.g., from the worker, the CPU 21 interprets and sends out the contents of individual instructions stored as assembly messages in the work register 22, e.g., to the display device 13a in the form of graphic or photographic display, or to the voice synthesizing apparatus 36. The contents of the individual instructions are output, e.g., displayed on the display device 13a and/or converted into voice signals by the voice synthesizing apparatus 36 and output as "spoken" assembly messages from the speaker 10. In step S20, the counter N is incremented, and in step S22, the routine checks whether the last of the assembly messages has been output. If the last of the assembly messages has not been output, the routine returns to step S18 to output the next assembly message (or, as noted above, a simultaneous or concurrent assembly message). Otherwise, the routine ends.

The interrupt routine shown in FIG. 4B may be employed to capture interactive input from the worker. As discussed above, the routine of FIG. 4B is operated substantially concurrently with that of FIG. 4A, and captures any interactive input for further action by the CPU 31 of the terminal 13.

In step S30, the interrupt routine scans for any interactive input, looping at step S32 until interactive input is received. Meanwhile, the operation of the routine of FIG. 4A proceeds. Of course, as previously indicated, interactive input may take the form of voice input from the transceiver 38 recognized by speech recognition input; mouse clicks from the mouse 13e; keyboard input from the keyboard 13d; or other interactive input.

In step S34, the interrupt routine receives the entire input (e.g., a second or two of voice input) and converts the input to a command recognizable by the system. In the case of speech recognition, the input may be converted into text or into a system code. In the case of keyboard input, key presses may also be converted into text or into system codes. In the case of mouse input, generally a mouse click will be converted into a system code, but may be further converted by means of a look-up table or the like into a text code. For example, if the interpretation step is to operate consistently on different types of input, it may be necessary to convert mouse clicks into a form identical to that of the result of speech recognition conversion for the identical command in spoken form.

In step S36, the interactive input, now in the form of a command, is interpreted. As indicated in FIG. 4B in a non-exhaustive list, several possible commands may be received, and a predetermined action taken by the processor 21 in view of each. For example, if "Next" is received as a command, the counter N (maintained to keep track of which assembly message is being played) may be incremented. Of course, since (in step S34) received input is converted to the command, then the received input corresponding to "Next" could be any equivalent input: a list of equivalent statements such as "Next one", "Go to the next one", "Proceed", etc. could be stored in the system memory for reference by the speech recognition engine to convert to "Next", and mouse clicks on a "Next" button or right-pointing arrow would also be converted to "Next" at step S34.

As further examples of commands, each of which would have equivalents that would be converted into a command at step S34, "Skip" would designate that the current assembly message should be moved ahead by two, "Again" would designate that the current assembly message should be moved back by one, "Restart" could direct the system to the first assembly message for that article number, "Last" could direct the system to the last assembly message for that article number. Each of these commands changes the assembly message (as discussed below with reference to step S38).

Other commands would change the behavior of the output, but with the same assembly message. For example, if "Faster" or "Slower" is received as a command, the speed at which digital video is output (frames per second) or successive assembly messages are output would be increased or decreased. "Pause", "Stop", or "Go" would arrest or continue the entire process of assembly message output accordingly. Other commands may control speaker volume, login and logout, or even a parts requisition to be sent to the central control apparatus 11. These commands would also have equivalents that would be converted into a command at step S34.

In step S38, the interrupt routine determines whether the assembly message is to be changed. If so, the routine proceeds to step S42, where the main process of FIG. 4A is restarted at step S18 with a new value of counter N, specifying a new assembly message. In this case, the interrupt routine restarts, ready for the next interactive input. If the assembly message does not change, the routine proceeds to step S40, where the output is modified as necessary (e.g., slowed or sped up, etc., as noted above). Even while the routine of FIG. 4A proceeds, the interrupt routine repeats continuously, either endlessly in the loop at S32 or from step S40, or restarting at step S42, and is thereby continuously ready to receive and interpret commands. Accordingly, as set forth in the flow charts depicted in FIGS. 4A and 4B, the controller 21 receives interactive input data from the operator input device, and interprets the interactive input data to control the output of assembly messages according to the interactive input data.

The output of assembly messages to the worker to carry out work according to the instructions may be explained with reference to the concrete examples described below. The examples herein illustrate the system employed as a work support system with respect to a wire harness. FIGS. 5 through 9 show the output of the display 13a of the terminal 13 for a typical series of assembly messages. Each of FIGS. 5 through 9 is in the form of a "screen view", e.g., the output of an LCD or CRT screen of the terminal 13, which would be displayed as part of the overall assembly message output for an article N#. Portions of each screen view are "static" (e.g., still images) or "dynamic" (e.g., movies or animations) as indicated below.

It is important to note that although the following description of FIGS. 5 through 9 below refers to the output of assembly messages to a screen in association with actual work or "work", training and simulation systems and modes are also contemplated. Accordingly, the description of FIGS. 5 through 9 should be considered to apply to the training and simulation systems and modes described herein.

FIG. 5 shows a graphical representation of an outline of parts and wire connection work to be performed to connect a relay box and a connector. The scene displayed on the screen of the terminal 13 corresponds to the actual work station and parts in front of the worker during work, i.e., the scene is shown in a concrete fashion and explanation is given while referring to the concrete scene. As referred to herein, "digital image" refers to a digitally encoded photograph image of the actual object (as opposed to, e.g., a drawing of the object).

As shown in FIG. 5, a scene on the display shows an outline of wire connecting work for an article numbered "N1" (a relay box) and an associated connector. The display outputs a scene including an article number portion 40, a part location portion 41, a digital image of the relay box 42 and a digital image of the connector 43 to be wire connected, and a narration button (button icon) 44. The part location portion 41 includes a representation of trays (which may be a digital image of part containers) corresponding to those in front of the worker during assembly work, and the part containers in the part location portion 41 "contain" representations of the parts, in the form of color symbol marks 41a–41c that correspond to color symbol marks found on the actual parts or on their containers, depictions of wires 41e, and the like. For example, the symbol mark 41a shows a designation of a wire of a predetermined color pattern (e.g., a red & white symbol corresponding to a red & white striped wire) and a shape of the terminal at the end of the same wire. Another indication would be that in which of long and short wires extending from a terminal should be employed is indicated(where both are present).

If the content of a work instruction, output as an assembly message, is for the worker to insert a cut electric wire of symbol mark 41a in a predetermined position in the relay box, then, as depicted in FIG. 5, the assembly message as output includes an arrow mark 45 that appears (e.g., animated or highlighted) and extends from the symbol mark 41a to the predetermined position in the digital image of the relay box 42. Thereafter, or simultaneously, an assembly message including the contents of the instructions as a voice message is output (either in the form of a synthesized voice or a recording). In the circumstance where the system is used to support actual work, a worker that understands the instructions may be expected to take out the actual cut electric wire from the actual part containers corresponding to those depicted on-screen in the part location portion 41, and insert the actual terminal into the corresponding actual position in the relay box corresponding to that designated by the arrow mark 45 in the digital image of the relay box 42.

On completion of the above work, the worker provides interactive input to indicate his or her preference with respect to the output of assembly messages. As indicated above, the interactive input may be in the form of voice commands such as "finished", "completed", "next" and the like, which are interpreted by the speech recognition section of the terminal 13. It should be noted that while the receipt of the worker's interactive input enables the system to respond to the worker and to provide the appropriate response, the character and timing of the worker's interactive input is also data which may be analyzed as described with respect to the third embodiment described below with respect to FIGS. 10B–11B. In the case of training or simulation, given at the stage of education and training prior to work in an actual assembly line, the worker may provide interactive input to indicate his or her will, preference, or intentions in the same manner as that to be employed in the actual assembly line, or may provide interactive input in an analogous fashion, e.g., by clicking the predetermined position by using a mouse 13e. In general, a sensor may be provided in the line that is responsive to the worker's indication of his or her will, intention, or preference.

It should be noted that the elements of the displayed scene correspond to assembly messages as previously described. For example, the overall background scene including the part location portion may be a generic scene in the form of a vector or bitmap graphical image used for several different article numbers. The digital images may be considered separately or together as an assembly message. The "narration button" may be a custom icon, with the corresponding assembly message including a bitmap image, or may be a system icon, with the corresponding assembly message including only a system code. At the same time, the entire scene may be stored as a single assembly message, e.g., a digitally compressed motion video file, or as an animation file with embedded digital motion video as indicated herein.

FIG. 6 shows a subsequent assembly message output, also in the form of a screen view, depicting a further graphical representation of the outline of parts and wire connection work to be performed to connect a relay box and connector. In FIG. 6, some of the elements are the same as displayed as in FIG. 5, or remain displayed from the display of FIG. 5. As shown in FIG. 6, a second arrow mark 45a extends from the representation of the drawer "containing" the wire 41c, and a digital image of a terminal 46 is displayed. Indication lines 47a, 47b (again, highlighted or animated) extend from the digital image of the terminal 46 to predetermined positions of the digital image of the relay box 42 and the digital image of the connector 43. In this manner, a worker can take out the actual wire from the actual container of parts, and insert the terminal, identical to that depicted on-screen, into the position corresponding to the points of the arrow marks and/or indication lines 47a, 47b of the actual relay box and the actual connector, each also identical to that depicted on-screen.

Again, as previously indicated, if, for example, the worker finds something ambiguous in instruction and/or assembly messages, the worker may employ interactive input, for example by uttering a vocal message such as "once more", "return" or the like, (which is picked up by a microphone and/or the transceiver 38). The CPU 31, in combination with the voice recognition software, deciphers the interactive input accordingly, for example, to repeat the same screen display. More than one vocal message may be considered as equivalent (e.g., the system interprets "once more" and "return" identically). In another example, if the screen indication or other assembly message output is too fast, the worker may employ interactive input to stop or slow the output, for example by saying the vocal message "stop" or "slowly", and the screen image would then be paused or slowed (e.g., intervals between successive still images increased, or the number of frames per second of a movie decreased). As previously noted, in the case of training or simulation, either the same interactive input as employed in actual work may be employed or an analogous interactive input, e.g., vocal instructions on the actual assembly line may be substituted by analogous interactive input using a mouse 13e or a keyboard 13d during training. In general, vocal instructions are superior when the worker is performing actual work since both hands are left free to perform the work. In especially noisy environments, large buttons or foot pedals can be used for interactive input, as well as shielded or highly directional microphones.

FIGS. 7 through 9 show the work support system in a different context, i.e., in the assembly of a wire harness and connector. In the description below with respect to FIGS. 7 through 9, interactive input such as voice instructions as described above are applicable in substantially the same manner as previously described, and explanation of the interactive input is omitted in the following description.

FIG. 7 shows an assembly message output in the form of a screen view, showing a graphical representation of the outline of parts and wiring work of a wiring harness and connector.

Specifically, FIG. 7 shows a screen displaying a schematic outline, entitled "Sub Assembly No. 1", of the wiring work for an article (connector). An indication of article number 51 in the form of text, a schematic diagram 53 (e.g., in the form of a bitmap or vector graphic) of an assembly diagram board showing a wire harness 54, and a digital image (photograph) of a connector 52 are all shown on the screen. An arrow mark 56 (e.g., which may be highlighted or animated) extends from the digital image of the connector 52 to a branch 55 of the wire harness 54, and the tip of the depicted branch 55 and/or the entire depicted branch 55 of the wire harness is emphasized (e.g., boldened, highlighted, animated, or displayed in a contrasting or different color). As previously described, the visual indication may be accompanied by an assembly message in the form of a synthesized or recorded voice message describing the content of the instructions. Again, if the worker understands the instructions, the connector of the related article number will be wired to the related branch of the wire harness, and if the worker does not understand, review may be requested by the interactive input as previously mentioned.

FIG. 8 shows a second assembly message or set of assembly messages (in the sequence following FIG. 7) output in the form of a screen view, showing a graphical representation of the outline of parts and procedure for bundling the wire harness. In particular, FIG. 8 shows a screen of assembly messages corresponding to instructions indicating binding procedures for the wire harness. FIG. 8 shows a screen displaying a schematic outline of the wiring work for a harness (connector) at title 61 entitled "STATION 5 ASSEMBLY". In this regard, different "article" numbers may be considered to extend to the same physical article at a different stage in its assembly, as in FIG. 8. That is, the "article" indicated at title 61 is the same wire harness as in FIG. 7, but is the at the fifth position of the assembly line.

FIG. 8 is different from the previously described screen depictions in that FIG. 8 includes an embedded (digital) video 62, which shows a moving picture of a skilled worker actually carrying out the binding work. That is, the moving picture 62 is displayed as part of the scene, but does not obstruct the remainder of the scene, in which the schematic diagram of the assembly diagram board is depicted. Moreover, the moving picture is related to the diagram of the wire harness 54 by the numeral "1" in a box 64, which indicates that the procedure depicted in the moving picture 62 is the first binding work to be carried out. As a further example of an assembly message, text box 63 indicates textual instructions descriptive of the operation to be carried out on the highlighted portion/branch of the wire harness 54a.

In operation, the worker first observes the moving picture to understand the work procedures, and then carries out the work procedures at the position and in the order indicated by the number box 64. For example, as depicted in FIG. 8, the motion picture 62 depicts a skilled person carrying out anti-splitting processing, and indicates the predetermined position 54a of the wire harness. In this case, the worker, if understanding the instructions, can carry out (for example) tape winding processing to the related portion. The worker may also, by means of the interactive input described herein, cause the motion picture 62 and/or the progress of the entire scene depicted in FIG. 8 to repeat, slow down, stop, etc., as previously described.

FIG. 9 shows a third assembly message or set of assembly messages in the sequence following FIGS. 7 and 8 and output in the form of a screen view, showing a further graphical representation of the outline of parts and procedure for bundling the wire harness. In particular, FIG. 9 is a screen including assembly messages representing instructions indicating further continued binding procedures of wire harness. In this case, the previously displayed moving picture (moving picture 62 of FIG. 8) is related to the diagram of the wire harness 54 by the numeral "2" in a box 65, which indicates that the procedure previously depicted is the second binding work to be carried out. That is, it is to be understood by the previous display of the moving picture and the successive displays of the text box 64 with numeral "1" and the text box 65 with numeral "2" that the procedure depicted in the moving picture 62 is to be carried out twice (albeit on different portions of the harness). Again, text box 63 indicates textual instructions descriptive of the operation to be carried out on the highlighted portion/branch of the wire harness 54a. Accordingly, the worker, while referring to the screen depicted in FIG. 9, carries out tape winding on the second predetermined position 54b of the wire harness.

Figure 10A:
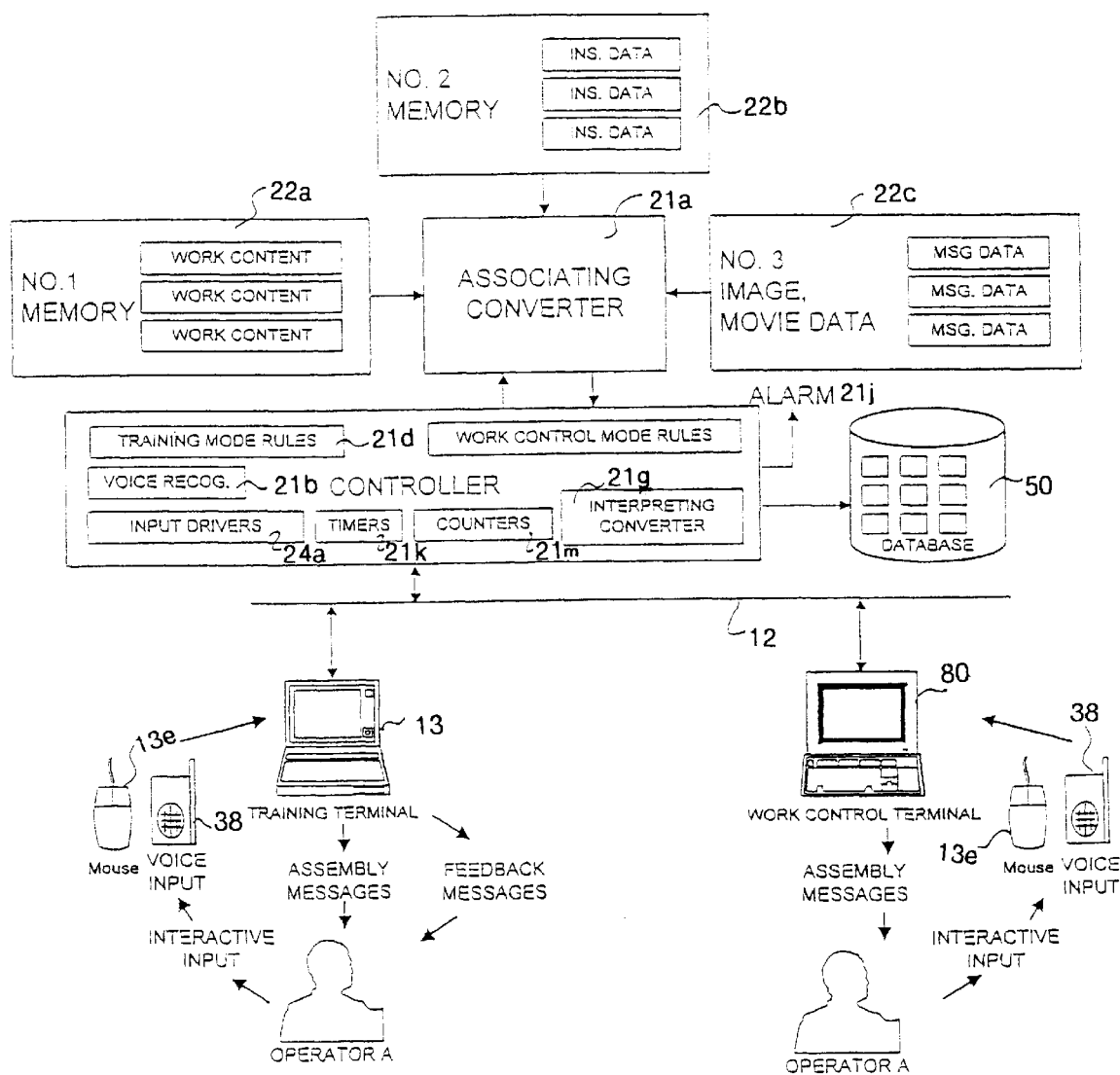
FIG. 10A is a block diagram showing a training/simulation and work control configuration of the work support system.

FIG. 10A depicts a further embodiment, in which the training or simulation system and the work support system are integrated with one another. Elements of FIG. 10A that are substantially the same as those in FIG. 4B are numbered with the same numbers, and a description of these similar elements is omitted herein.

FIG. 10A depicts a work control terminal 80, as distinct from a training terminal. While the training terminal 13 may provide feedback messages, especially in the simulation or practice system mode, the work control terminal 80 is used during actual work. Accordingly, such feedback is not strictly necessary, and even if a message similar to a feedback message is used, such is considered an assembly message.

In addition to the elements shown in FIG. 4A and the work control terminal 80, the embodiment of FIG. 10A is depicted with additional, optional elements (e.g., 21j, 50) for the purpose of work control. Although these additional elements are shown in FIG. 10A, the training terminal 13 and work control terminal 80 may be integrated without such additional elements.

FIG. 10A depicts an assembly work support system similar to that of FIG. 3B, but in which provisions for both teaching/simulation and actual work support are provided. Training instruction data describing processing of an assembly is readable from the memories 22a, 22b, and 22c as previously described. Training terminals 13 and work support terminals 80 may be substantially identical, but differ based on how the system treats the terminal 13 or 80. Each terminal 13, 80 is connected to the controller 21 of the central control apparatus 11, and reads instruction data from the memories 22a, 22b, 22c via the central processor 21. The terminals 13, 80 outputs corresponding assembly or training messages that include one or both of voice signals and image signals to the worker or operator. As previously noted, an operator input device is provided in the form of one or both of a mouse or a transceiver 38 (or alternatives thereto), and the controller 21 communicates with the terminals via a transmission apparatus in the form of one or more input drivers 24a. The operator input devices 13e, 38 are adapted to receive interactive input data from the operator in the form of voice input, mouse clicks, and/or keyboard input as described herein (as examples).

The controller 21, in combination with training mode rules 21d (which may include one or both of the teaching rules 21e, and simulation rules 21f previously described with reference to FIG. 3B) is a training or simulation controller, and holds the training or simulation "rules". The controller 21 receives the worker's interactive input as data from the interactive input devices 13e and 38, interprets the interactive input data at least by means of an interpreting converter 21g (carrying out a process as set forth with respect to FIG. 4B), and controls the output of assembly training messages according to the interactive input data, e.g., as set forth in FIG. 4B.

The training mode rules 21d are substantially as previously described. The work control mode rules 21h are similar to the training mode rules 21d, except that the work control mode rules 21h take into account the work flow and other operators on the system. That is, the worker may not be permitted to proceed to a successive procedure until another worker is finished, or may not be permitted to indicate "done" until the system confirms that sensors or safety blocks on the assembly line would so permit. Of course, the work control mode rules 21h may also be substantially identical to the training mode rules, with each operator or worker able to independently direct his or her work control terminal.

In this regard, the controller 21, in combination with the training mode rules 21d provided therein, is a training mode or simulation controller that, e.g., receives first interactive input data from an operator via a first operator input device such as the mouse 13e or transceiver 38 associated with the training terminal 13 (i.e., an input device adapted to receive first interactive input data from the operator) and interprets the first interactive input data to provide training feedback to the operator. At the same time, a work control terminal 80 also receives output signals and outputs corresponding assembly messages to an operator. The controller 21, in combination with the work control mode rules 21h provided therein, is a work control controller that receives second interactive input data via a second operator input device, such as the mouse 13e or transceiver 38 associated with the work control terminal 40 (i.e., adapted to receive the second interactive input data from the operator), and interprets the second interactive input data.

Both of the training mode or simulation controller and the work control controller share memory storage 22a, 22b, and 22c from which instruction data for processing an assembly is readable, and both share a converter in the form of associating converter 21a (e.g., corresponding to the routines carried out in FIGS. 4A and 4B) that reads the instruction data and converts the instruction data into output signals that include one or both of voice signals and image signals.

Accordingly, resources devoted to the distinct tasks of training and actual work support are effectively and efficiently shared. Moreover, since training and work support share most of the same instruction data from the memories 22a, 22b, and 22c, disparities between training and work support instructions are minimized, since a change made to the training instructions may be propagated to the work support instructions and vice versa.

As previously noted, if the worker, having completed the predetermined work, employs interactive input to that effect (e.g., by voice), the CPU 23 recognizes the interactive input. In this regard, as described below with respect to FIGS. 10B through 11B, it becomes possible to record, interpret, and even control actual work time (line balance, waiting time), production control, and labor control (working time control). That is, the work control controller can record the interpreted interactive input data in a database.

Figure 10B:
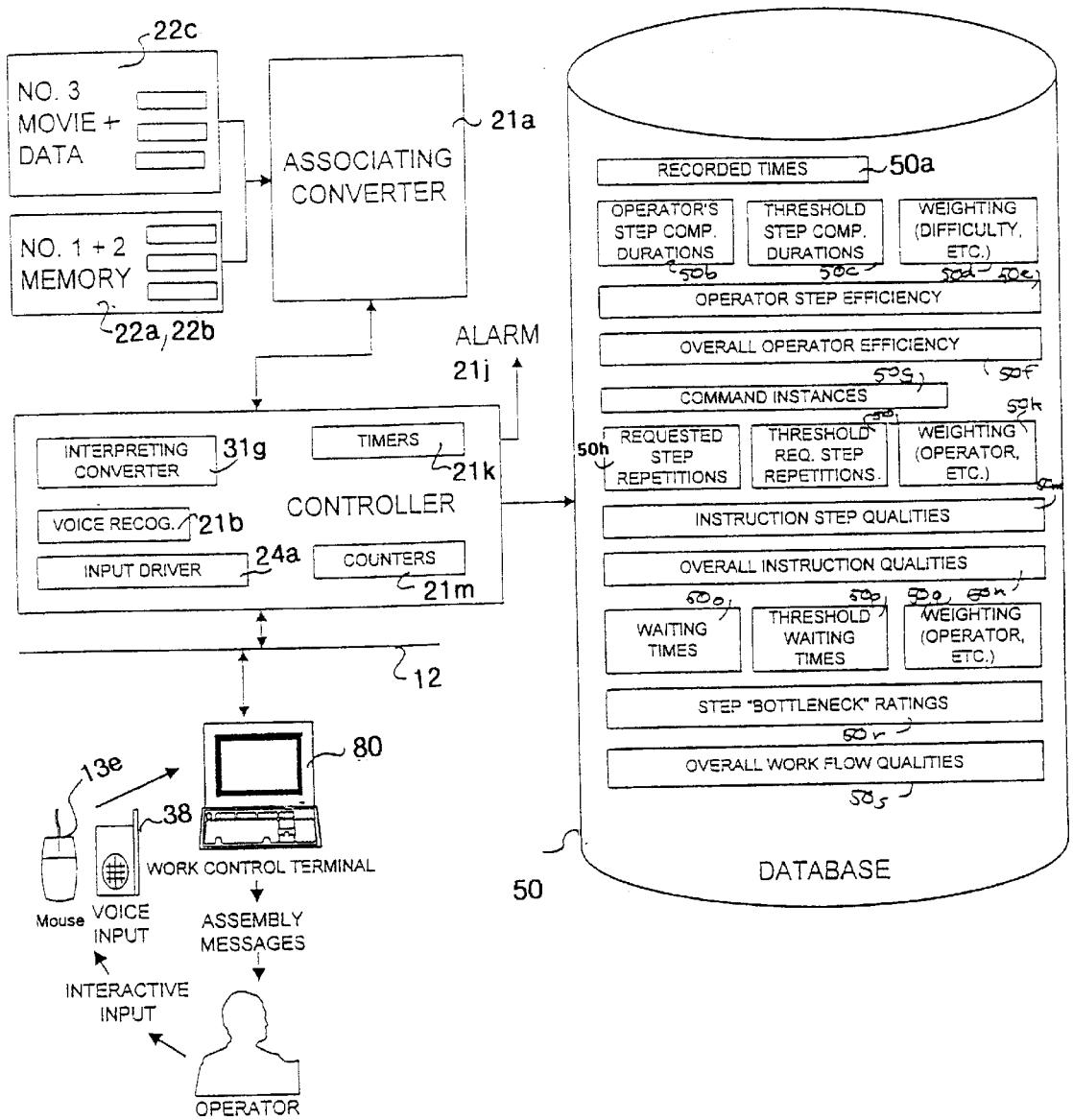
FIG. 10B is a block diagram showing in further detail a work control and database configuration of the work support system.

FIG. 10B depicts an additional embodiment of the work control terminal 80 in association with the central controller 21. The embodiment depicted in FIG. 10B may be employed together with that shown in FIG. 10A, i.e., with the integrated simulation and work control assembly work support system (this option being indicated in FIG. 10A by the presence of the alarm 21j and database 50 therein); or may be employed without the additional training and simulation facilities of FIG. 10A.

As shown in FIG. 10B, since the controller 21 receives the interactive input data, the controller 21, by recording the data directly in a database 50, may further interpret the interactive input data from the work control terminal 80 for the purpose of improving the system. In this respect, the wire harness assembly work support system includes, as with the other embodiments, memory storage such as memories 22a, 22b, 22c from which instruction data for processing an article is readable, and a converter such as the associating convertor 21a that reads the instruction data and associates and/or converts the instruction data into an output signal that includes one or both of a voice signal and an image signal. A work control terminal 80 receives the output signal and outputs corresponding assembly messages to an operator. At least one operator input device, such as the mouse 13e or voice input 38, is adapted to receive interactive input data from the operator. The controller 21 receives the interactive input data from the operator input device 13e, 38, etc. and interprets the interactive input data (as further set forth below). All of the interpreted data is stored in a database 50. An alarm 21j is provided for output of a signal in response to exceeding a predetermined threshold with respect any of the "ratings" discussed herein.

In the system employed in FIG. 10B, in order to capture and record the interactive input data in a meaningful fashion, a different interrupt process from that of FIG. 4B is employed. The different interrupt process is shown in FIG. 11A. Although the interrupt routine is different, the main routine as expressed in FIG. 4A is also used in this embodiment, but as the worker provides interactive input, the interactive input is further interpreted and recorded. Those steps in FIG. 11A that are substantially identical to steps of FIG. 4B are indicated by the same reference numerals, and a description of the same is omitted herein.

Figure 11B:
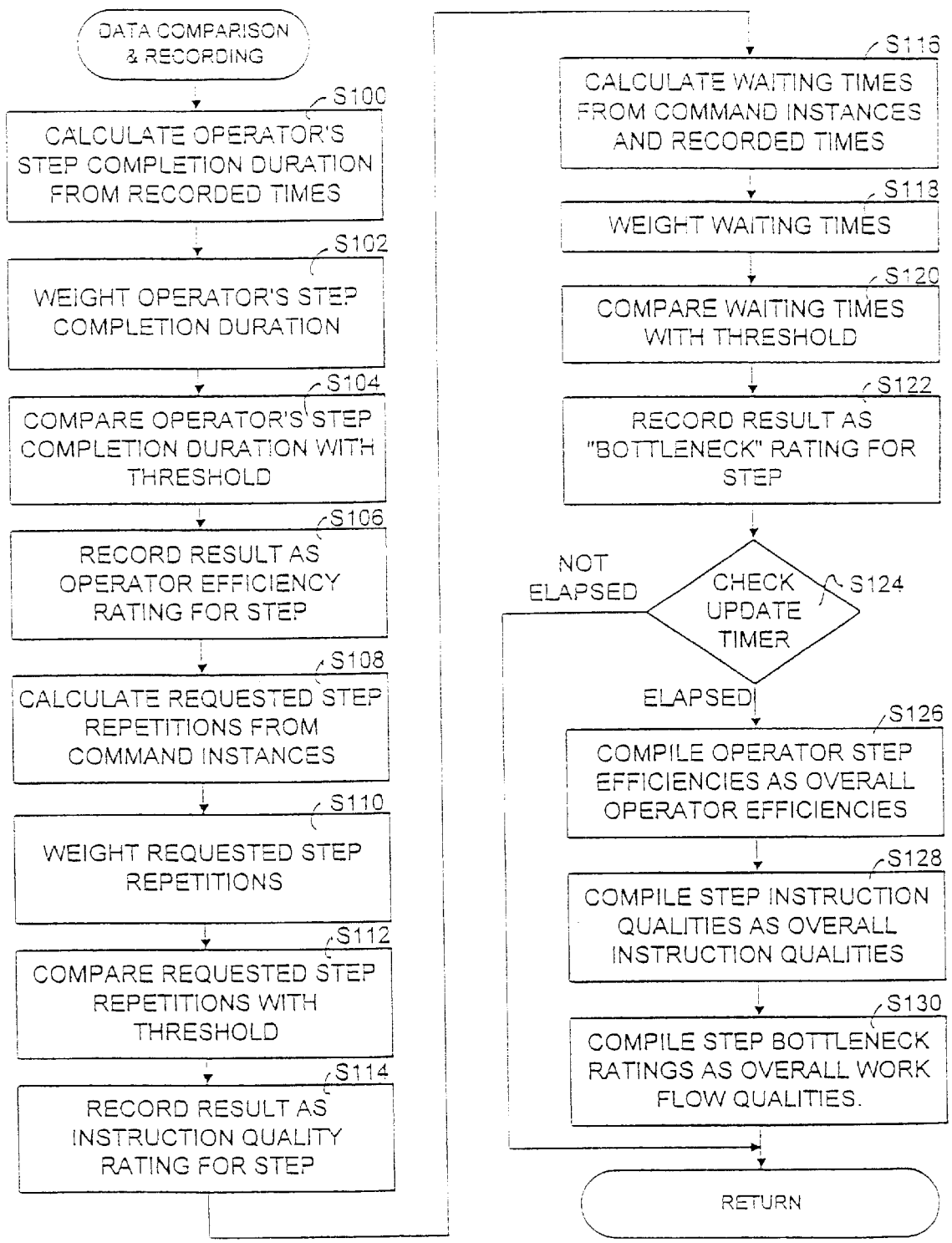
FIG. 11B is a flow chart describing an data comparison and recording routine for calculating, interpreting and recording work control data.

Following step S36 of the routine of FIG. 11A, substantially identical to that of FIG. 4B, in which the command is interpreted and either a variable changed or some future task mandated by setting a flag, etc., step S60 is executed. In step S60, with the use of timers 21k and counters 21m (shown in both of FIGS. 10A and 10B), the central controller 21 records at least the time of the command to a storage area 50a of the database 50, and the instance (e.g., the 25th recording of this command) of the command to a storage area 50g of the database 50, along with "identifiers" for the record number (so that the recordings of area 50a and 50g may be associated), the worker's ID, the station ID, and those items necessary to interpret the data as set forth below. A data comparison and recording step S62, which is detailed in FIG. 11B, is then performed, in which some interpretation and analysis of the recorded data is performed each time and some interpretation and analysis is performed according to a predetermined schedule (steps S124–S136 of FIG. 11B). The routine then returns to substantially the same process as was previously described with reference to FIG. 4B.

In the data comparison and recording routine of step S62, as set forth in FIG. 11B, useful values representative of tangible work control parameters, important for the improvement of worker performance and line balance, are determined and recorded.

In step S100, the time required for a particular worker to complete a particular instruction is determined from the recorded times, e.g., since the worker indicates the completion of steps by means of the interactive input, the recordings of the same may be compared to the times recorded in memory area 50a to determine how long the operator takes (average, maximum, minimum, etc.) to complete a particular step. These values are recorded in memory area 50b.

In step S102, the recorded values in memory area 50b may be weighted by predetermined characteristics stored in memory area 50d, e.g., according to step difficulty, operator experience, and other modifiers that improve the quality of the data recorded in memory area 50b.

In step S104, the weighted step completion durations recorded in memory area 50b are compared with threshold step completion durations recorded in memory area 50c, i.e., threshold step completion durations under which or over which improvement is sought, so that underperforming workers, as well as exceptional workers, may be identified. The comparisons are converted, e.g., by percentage or other conventional statistical means, to form a representative index as an "operator efficiency rating" for this particular step and operator, which are recorded in memory area 50e in step S106. Accordingly, those steps with which a worker has particular difficulty, or those steps to which the worker is particularly suited or in which the worker is particularly skilled, may be identified. An overall operator efficiency is determined by conventional statistical means, and may be stored in memory area 50f in step S126.

In step S108, the number of times that operators request explanation of a particular step to complete a particular instruction is determined from the recorded command instances, e.g., since each worker requests a review of a particular assembly message or set thereof by means of the interactive input, the recordings of the same may be compared to command instances recorded in memory area 50g to determine how often (number of times, frequency, etc.) a particular assembly message is requested. These values are recorded in memory area 50h.

In step S108, the recorded values in memory area 50h may be weighted by predetermined characteristics stored in memory area 50k, e.g., according to step difficulty, operator experience, and other modifiers that improve the quality of the data recorded in memory area 50h.

In step S112, the weighted step repetitions recorded in memory area 50h are compared with threshold step repetitions recorded in memory area 50j, i.e., a threshold step repetition value under which or over which improvement is sought, so that unclear or poorly designed instructions or assembly messages, as well as optimal messages, may be identified. The comparisons are converted, e.g., by percentage or other conventional statistical means, to form a representative index as an "instruction quality rating" for this particular step, which are recorded in memory area 50m in step S114. Accordingly, those instructions that are particularly unclear, or those steps which every worker seems to understand well, may be identified. An overall instruction quality, by which sets of assembly messages may be compared (e.g., by article) is determined by conventional statistical means, and may be stored in memory area 50n in step S128.

In step S116, the waiting times between steps of the assembly process are determined from the both of the recorded command instances and recorded times, e.g., since each worker indicates his or her readiness for the next step by means of the interactive input, the recordings of the same may be compared to times and command instances recorded in memory area 50a and 50g to determine how much waiting time follows each step before the next step may be started. These values are recorded in memory area 50o.

In step S118, the recorded values in memory area 50o may be weighted by predetermined characteristics stored in memory area 50q, e.g., according to step difficulty, operator experience, critical path modifiers and other modifiers that improve the quality of the data recorded in memory area 50o.

In step S120, the weighted waiting times recorded in memory area 50o are compared with threshold waiting times recorded in memory area 50p, i.e., a threshold waiting time under which or over which improvement is sought, so that bottlenecks in the process such as steps that are too long, as well as steps that are too short and may also create idle time, may be identified. The comparisons are converted, e.g., by percentage or other conventional statistical means, to form a representative index as a "step bottleneck rating" for this particular step, which are recorded in memory area 50r in step S122. Accordingly, those steps that are particularly obstructive, or those steps which every worker seems to complete prematurely, may be identified. An overall work flow quality, by which the work flow of different articles may be compared is determined by conventional statistical means, and may be stored in memory area 50s in step S136.

Overall ratings need only be recalculated once a sufficient amount of data is collected, and moreover, may be periodically compared (e.g., weekly or monthly). Accordingly, the overall ratings are only calculated according to an update timer in step S124, which skips the compilation or calculation of overall ratings or qualities if the desired interval has not passed. However, if the update timer (which may be one of the timers 21k) has elapsed, all of steps S126, S128, and S136 as described above are carried out.

Accordingly, as shown in FIGS. 10B–11B, in the assembly work support system of FIG. 10A or 10B, the controller 21 interprets the interactive input data and records in the database 50 operator efficiency or performance in memory area 50e and 50f by comparing at least operator step completion times from memory area 50b to a threshold step completion times from memory area 50c. Further, the controller 21 interprets the interactive input data and records in the database 50 instruction quality in memory area 50m and 50n by comparing at least a number of repetitions of requested instruction data from memory area 50m to a threshold number of repetitions of requested instruction data from memory area 50n. Moreover, the controller 21 interprets the interactive input data and records in the database 50 work flow quality in memory area 50r and 50s by comparing at least waiting times from memory area 50o and instruction completion times from memory area 50b to threshold waiting times from memory area 50p and threshold instruction completion times from memory area 50c.

As described above, when the work support system of the present invention is used (for example, for wire harness assembly), not only are assembly messages and instructions transmitted to the worker, but the commands and interactive input from the worker may be transmitted. Consequently, it is possible to direct the work in a timely fashion through a "dialogue" with the worker. Accordingly, the system permits even workers less accustomed to the particular procedures to steadily perform work, and the system thereby improves work efficiency and quality, e.g., by preventing accidents, mistakes and other inadvertent acts.

Accordingly, each of the embodiments of the invention is an assembly work support system including memory storage from which instruction data for processing an assembly is readable. Each embodiment includes a converter such as CPU 21 or associating convertor 21a that, in response to a work start signal, reads the instruction data and converts the instruction data into an output signal that includes one or both of a voice signal and an image signal. Each is provided with at least one terminal that receives the output signal and outputs corresponding assembly messages to an operator or worker. Each is provided with one or more operator input devices such as a mouse 13e, keyboard 13d, or voice recognition setup (38-34-31 and software), adapted to receive interactive input data from the operator or worker. Each includes a controller such as CPU 31 that receives the interactive input data from the operator input device and interprets the interactive input data.

In another expression of the work support system according to the present invention, the work support system includes a memory in which the contents of instructions, such an as item by item work sequence to process an article (such as a wire harness), are stored. A conversion device or system reads out the contents of the instructions (e.g., assembly messages) stored in the memory in response to the input of a work start signal from a worker, and converts the contents of instructions, e.g., into a voice signal and/or image signal. One or more output devices, such as a display or speaker, output the converted voice signal(s) or image signal(s) to the worker. Moreover, the worker's interactive input in the form of instructions, confirmation, or commands are transmitted back to the system. The system is capable of carrying out work control based on the transmitted instructions, confirmation, or commands from the user.

According to this structure, the article (e.g., wire harness) to be processed is specified by the input of a work preparation signal (e.g., by reading the article number as a code), and the contents of all of the instructions necessary to completely assemble or process the article are sequentially conveyed to the worker, e.g., by image or voice. When the worker wants to convey his or her will, i.e., to change the behavior of the system according to the worker's needs, necessary interactive input of instructions may be given, and the system can perform work control based on the worker's interactive input. Further, an assembly training and practice system may be built up even before the assembly line is constructed or ready for operation. Moreover, in the case of the introduction of a new or retrained worker into the actual line, full synchronization of the instructions from the training and practice system with the actual work can be achieved.

As noted, the interactive input ("instructions") may be transmitted to the system as voice signals (the worker's voice). In this case, the system control (e.g., in combination with voice recognition software) recognizes the transmitted voice, and may perform work control based on the recognition result.

In assembling an article (such as wire harness), the assembly training and practice system may used in combination with a sensor for work confirmation provided in the actual assembly line. In this manner, the work support system is easy for the workers to understand and allows confirmation of the progress of work performed and the prevention of erroneous fitting of parts.

As described, the system may be furnished with a transceiver (wireless microphone) 38 and an antenna (as a communication apparatus) 34 which transmit vocal signals based on the worker's voice, and/or a mouse 13e to be operated by the worker. If voice signals are employed, the CPU 31 may be loaded with, or may work in association with, voice recognition software, and work control may then be carried out based on the result of voice recognition. Alternatively, the worker's will may be indicated by "operations", such as mouse clicks and/or keyboard operations transmitted to the system. In this case, the system recognizes the transmitted operation contents, and may perform work control based on the recognition result.

According to the system contemplated by the inventor, not only the matters necessary for performance of the work are output to the worker, in order, but also the transmission of the worker's will to the system is possible. Accordingly, timely progress of work can be expected by means of this "dialogue" with the worker, and even workers less accustomed to the particular assembly operations may work steadily. In this manner, improvement in work efficiency and quality may be expected by prevention of any inadvertence on the part of the worker.

Although the above description sets forth particular embodiments of the present invention, modifications of the invention will be readily apparent to those skilled in the art, and the inventor expressly intends that the scope of the invention, as well as elements necessary for the invention to function, be determined solely by the appended claims. Changes may be made, within the purview of the appended claims, as presently stated and as amended, without departing from the scope and spirit of the present invention in its aspects. The features of the invention can be used not only in the respective combination disclosed, but also in other combinations or individually, without departing from the scope of the invention. Not all of the process steps or apparatus elements described in detail herein are necessary for a complete and functional expression of the invention, and no one or more of the described limitations is critical or necessary to the operation of the invention, except as explicitly described herein.

What is claimed is:

1. An assembly work support system comprising:
   memory storage from which instruction data including direction information describing a manner of processing an assembly of a plurality of discrete parts is readable;
   a converter that, in response to a work start signal, reads said instruction data and converts said instruction data into an output signal that includes at least one of a voice signal and an image signal;
   a terminal that receives the output signal and outputs corresponding assembly messages to an operator;
   an operator input device adapted to receive interactive input data from the operator; and
   a controller that receives said interactive input data from the operator input device, and interprets said interactive input data to provide feedback to the operator by selecting, depending on said interactive input data, which of said instruction data are read and which assembly messages are output.

2. The assembly work support system according to claim 1, wherein
   said operator input device comprises a microphone for receiving spoken commands as interactive input data;
   said controller comprises a voice recognition system for converting each spoken command into a command that controls output of said assembly messages.

3. The assembly work support system according to claim 2, wherein said operator input device comprises a wireless transmitter worn by an operator for transmitting said spoken commands as interactive input data.

4. The assembly work support system according to claim 1, wherein
   said operator input device comprises a depressible button for receiving each manual actuation as interactive input data.

5. The assembly work support system according to claim 1, wherein said instruction data includes step by step work sequence instructions for processing at least one part of an assembly of a plurality of discrete parts.

6. The assembly work support system according to claim 5, wherein said memory storage includes a plurality of memories, and wherein said plurality of memories separately store (i) work content items cross-referenced to a plurality of parts of an assembly of a plurality of discrete parts; (ii) at least one instruction for each work content item; and (iii) auxiliary data corresponding to said instructions.

7. The assembly work support system according to claim 6, wherein each said instruction comprises at least one of visual layouts of symbolic information and audio voice signal information.

8. The assembly work support system according to claim 6, wherein each said auxiliary data comprises at least one of a photograph of a part; motion video of an operator performing an instruction; and a schematic image of an assembly diagram board.

9. The assembly work support system according to claim 1, wherein said terminal comprises a voice synthesizing apparatus, and wherein said convertor converts said instructions into synthesized voice audio signals as assembly messages.

10. The assembly work support system according to claim 1, wherein
    said controller changes at least one of a sequence and a rate of output of said assembly messages depending on an interpretation of said interactive input data.

11. An assembly work support system controller connectible to an output terminal, comprising:
    memory storage from which instruction data including direction information describing a manner of processing an assembly of a plurality of discrete parts is readable;
    a converter that, in response to a work start signal, reads said instruction data and converts said instruction data into an output signal that includes at least one of a voice signal and an image signal;
    a network transmission apparatus adapted to transmit the output signals to the terminal and that receives interactive input data from the terminal;
    a terminal that receives the output signal and outputs corresponding assembly messages to an operator;
    an operator input device adapted to receive interactive input data from the operator; and
    a controller that receives said interactive input data, and interprets said interactive input data to provide feedback to the operator by selecting, depending on said interactive input data, which of said instruction data are read and which assembly messages are output.

12. The assembly work support system controller according to claim 11,
wherein said controller changes at least one of a sequence and a rate of output of said assembly messages depending on an interpretation of said interactive input data.

13. A wire harness assembly work support system comprising:
memory storage from which instruction data including direction information describing a manner of processing a wire harness assembly of a plurality of discrete parts is readable;
a converter that reads said instruction data and converts said instruction data into an output signal that includes at least one of a voice signal and an image signal;
a terminal that receives the output signal and outputs corresponding wire harness assembly messages to an operator;
an operator input device adapted to receive interactive input data from the operator; and
a controller that receives said interactive input data from the operator input device and interprets said interactive input data to control said output of said wire harness assembly messages according to said interactive input data by selecting, depending on said interactive input data, which of said instruction data are read and which assembly messages are output.

14. A wire harness assembly work support system comprising:
memory storage from which instruction data including direction information describing a manner of processing a wire harness assembly of a plurality of discrete parts is readable;
a converter that reads said instruction data and converts said instruction data into an output signal that includes at least one of a voice signal and an image signal;
a terminal that receives the output signal and outputs corresponding wire harness assembly messages to an operator;
an operator input device adapted to receive interactive input data relating to wire harness assembly from the operator;
a controller that receives said interactive input data from the operator input device and interprets said interactive input data by generating interactive input interpretation data relating to wire harness assembly; and
a database that stores the interactive input interpretation data relating to wire harness assembly.

15. The wire harness assembly work support system according to claim 14, wherein the controller interprets said interactive input data and records in said database wire harness assembly operator efficiency and performance by comparing at least operator step completion times to a threshold step completion time.

16. The wire harness assembly work support system according to claim 14, wherein the controller interprets said interactive input data and records in said database wire harness assembly instruction quality by comparing at least a number of repetitions of requested instruction data to a threshold number of repetitions of requested instruction data.

17. The wire harness assembly work support system according to claim 14, wherein the controller interprets said interactive input data and records in said database wire harness assembly work flow quality by comparing at least waiting times and instruction completion times to threshold waiting times and instruction completion times.

18. A wire harness assembly work support method comprising:
storing instruction data including direction information describing a manner of processing a wire harness assembly of a plurality of discrete parts;
reading said instruction data;
converting said instruction data into an output signal that includes at least one of a voice signal and an image signal;
receiving the output signals and outputting corresponding wire harness assembly messages to an operator;
receiving interactive input data from an operator;
evaluating said interactive input data for predetermined characteristics including whether said interactive input data correctly corresponds to said wire harness assembly messages; and
providing feedback to said operator via a second output signal that includes at least one of a sound signal and an image signal.

19. An assembly work support system comprising:
first memory storage from which training instruction data including direction information describing a manner of processing of an assembly of a plurality of discrete parts is readable;
a simulation terminal that reads said training instruction data and outputs corresponding assembly training messages that include at least one of voice signals and image signals to an operator;
an operator input device adapted to receive interactive input data from the operator;
a training controller that receives said interactive input data, interprets said interactive input data, and controls said output of said assembly training messages according to said interactive input data; and
a simulation controller that receives said interactive input data, evaluates said interactive input data for predetermined characteristics including whether said interactive input data correctly corresponds to said assembly training messages, and provides feedback to said operator via an output signal that includes at least one of a sound signal and an image signal.

20. An assembly work support system comprising:
memory storage from which instruction data including direction information describing a manner of processing of an assembly of a plurality of discrete parts is readable;
a converter that reads said instruction data and converts said instruction data into output signals that include at least one of voice signals and image signals;
a simulation terminal that receives said output signals and outputs corresponding assembly training messages to an operator;
a first operator input device adapted to receive first interactive input data from the operator;
a simulation controller that receives said first interactive input data and interprets said first interactive input data to provide training feedback to the operator by selecting, depending on said first interactive input data, which of said instruction data are read and which assembly messages are output;
a work control terminal that receives said output signals and outputs corresponding assembly messages to an operator;
a second operator input device adapted to receive second interactive input data from the operator;

a work control controller that receives said second interactive input data and interprets said second interactive input data by selecting, depending on said second interactive input data, which of said instruction data are read and which assembly messages are output.

21. The assembly work support system according to claim 20, wherein the work control controller generates interactive input interpretation data relating to wire harness assembly from said second interpreted interactive input data and; records said interactive input interpretation data in a database.

22. The assembly work support system according to claim 20, wherein the work control controller interprets said second interactive input data to control said output of said assembly messages according to said second interactive input data.

23. The assembly work support system according to claim 1, the assembly messages including at least one of a voice message and an image message including directions describing a manner of processing of an assembly.

24. The assembly work support system controller according to claim 11, the assembly messages including at least one of a voice message and an image message including directions describing a manner of processing of an assembly.

25. The wire harness assembly work support system according to claim 13, the wire harness assembly messages including at least one of a voice message and an image message including directions describing a manner of processing of a wire harness assembly.

26. The wire harness assembly work support system according to claim 14, the wire harness assembly messages including at least one of a voice message and an image message including directions describing a manner of processing of a wire harness assembly.

27. The wire harness assembly work support method according to claim 18, the wire harness assembly messages including at least one of a voice message and an image message including directions describing a manner of processing of a wire harness assembly, and the feedback to said operator including at least one of a sound signal and an image signal.

28. The assembly work support system according to claim 19, the assembly training messages including at least one of a voice message and an image message including directions describing a manner of processing of an assembly.

29. The assembly work support system according to claim 20, each of the assembly training messages and assembly messages including at least one of a voice message and an image message including directions describing a manner of processing of an assembly.

30. A wire harness assembly simulator comprising:

data storage including wire harness assembly training instruction data, the wire harness assembly training instruction data including at least one of a motion video that depicts a manner of processing of a wire harness assembly of a plurality of discrete parts and an animation file that depicts a manner of processing of a wire harness assembly of a plurality of discrete parts;

a simulator terminal that reads said training instruction data and outputs corresponding wire harness assembly training messages that display at least one of said motion video or said animation file to an operator to simulate wire harness assembly of one discrete part to another discrete part;

an operator input device adapted to receive, from the operator, interactive input data responsive to said wire harness assembly training messages; and a controller that receives said interactive input data, interprets said interactive input data by selecting, depending on said interactive input data, which of said wire harness assembly instruction data are read and which wire harness assembly messages are output.

31. The wire harness assembly simulator according to claim 30, wherein said simulation controller further evaluates said interactive input data for predetermined characteristics including whether said interactive input data correctly corresponds to said wire harness assembly messages, and provides feedback to said operator via an output signal that includes at least one of a sound signal and an image signal.

* * * * *